United States Patent
Oguro et al.

(10) Patent No.: US 8,380,997 B2
(45) Date of Patent: Feb. 19, 2013

(54) POWER SUPPLY OF STORAGE SYSTEM

(75) Inventors: Ryohei Oguro, Yokohama (JP); Yosuke Tsuyuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 347 days.

(21) Appl. No.: 12/733,162

(22) PCT Filed: Jan. 29, 2010

(86) PCT No.: PCT/JP2010/000539
§ 371 (c)(1),
(2), (4) Date: Feb. 16, 2010

(87) PCT Pub. No.: WO2011/092743
PCT Pub. Date: Aug. 4, 2011

(65) Prior Publication Data
US 2011/0191604 A1  Aug. 4, 2011

(51) Int. Cl.
*G06F 1/00* (2006.01)
(52) U.S. Cl. ........................................ 713/300
(58) Field of Classification Search .......... None
See application file for complete search history.

(56) References Cited

U.S. PATENT DOCUMENTS

| 7,243,248 B1 * | 7/2007 | Roux et al. ........... 713/300 |
| 7,698,595 B2 * | 4/2010 | Inoue et al. ........... 714/14 |
| 8,135,967 B2 * | 3/2012 | Tsuyuki ................ 713/300 |
| 2007/0016811 A1 | 1/2007 | Suzuki et al. |
| 2007/0170782 A1 * | 7/2007 | Suzuki et al. .......... 307/28 |
| 2007/0205664 A1 | 9/2007 | Kawakubo et al. |
| 2011/0025129 A1 * | 2/2011 | Humphrey et al. ........ 307/64 |

FOREIGN PATENT DOCUMENTS

| EP | 1 411 523 A2 | 4/2004 |
| EP | 1 830 271 A1 | 9/2007 |
| EP | 1 843 248 A1 | 10/2007 |
| JP | 2004-126972 | 4/2004 |
| WO | WO 2010/097840 A1 | 9/2010 |

OTHER PUBLICATIONS

U.S. Appl. No. 12/310,735, Tsuyuki.
PCT International Search Report and Written Opinion on application No. PCT/JP2010/000539 dated Oct. 29, 2010; 11 pages.

* cited by examiner

*Primary Examiner* — Mohammed Rehman
*Assistant Examiner* — Vincent Chang
(74) *Attorney, Agent, or Firm* — Foley & Lardner LLP

(57) ABSTRACT

A storage system comprises multiple physical storage devices, and a power supply for the multiple physical storage devices. Each physical storage device requires an input of a first voltage and an input of a second voltage that is a lower voltage than the first voltage. The power supply comprises a first power supply circuit that is made redundant and a second power supply circuit that is made redundant. Each first power supply circuit outputs a first voltage, which is input to the respective physical storage devices. Each second power supply circuit outputs a second voltage to a storage device group (two or more physical storage devices of the multiple physical storage devices) corresponding to this second power supply circuit. Each second power supply circuit is isolated from a circuit board comprising the first power supply circuit.

12 Claims, 37 Drawing Sheets

FIG.23A

| VOLTAGE TYPE | 3.5 inch | 2.5 inch | POWER RATIO |
|---|---|---|---|
| 12V | 21.6W | 9.6 W | 0.45 |
| 5V | 7.5W | 7.5W | 1 |
| TOTAL POWER | 29.1W | 17.1W | 0.59 |

FIG.23B

| VOLTAGE TYPE | 3.5 inch x 40 | 2.5 inch x 64 | POWER RATIO |
|---|---|---|---|
| 12V | 864W | 614W | 0.71 |
| 5V | 300W | 480W | 1.60 |
| TOTAL POWER | 1164W | 1094W | 0.94 |

POWER SUPPLY OF STORAGE SYSTEM

TECHNICAL FIELD

This invention generally relates to a storage system, specifically to the power feeding part of the storage system.

BACKGROUND ART

An example of a technology regarding the power supply of a storage system is the technology disclosed in Patent Citation 1. Patent Citation 1, for example, discloses the following.

As shown in FIG. 1, the storage system 500 has one or more enclosures 501 and redundant power supply units 503A and 503B. The power supply unit 503A (503B) includes a 56-volt power supply 504A (504B) (the AC/DC converter which converts AC voltage from the AC power supply into 56-volt DC voltage). The enclosure 501, as shown in FIG. 2, includes multiple canisters 502. Each canister 502 includes an HDD (Hard Disk Drive) 509, a 12-volt power supply 507 (DC/DC converter which lowers DC voltage from 56-volt to 12-volt), a 5-volt power supply 508 (DC/DC converter which lowers DC voltage from 56-volt to 5-volt) and a backflow prevention elemental device 509 (for example, a diode).

In the canister 502, one power feeding path (hereinafter referred to as "first path") includes a backflow prevention elemental device 509, and the other power feeding path (hereinafter referred to as "second path") includes two backflow prevention elemental devices 509. Usually, power is supplied from one 56-volt power supply 504A through the first path (main power feeding path) to the power supply 507 and 508 in each canister 502, and in case of failure, power is supplied from the other 56-volt power supply 504B through the second path to the power supply 507 and 508 in each canister 502. That is, a power supply boundary 510 is supposed to be formed in each canister 502. "Power supply boundary" indicates the configuration where, in the system which includes a power feeding system in each storage device group configured of one or more storage devices (according to FIG. 2, a storage device group is an HDD 509), includes boundaries among the power feeding systems so that, even if the power feeding path in one power feeding system shorts out and consequently power is not supplied to the storage device group corresponding to the power feeding system, power feeding will be continued through the power feeding path of another power feeding system to the other storage device groups. In other words, each power supply boundary is each of the storage device groups corresponding to the power feeding systems.

CITATION LIST

Patent Literature

[PTL 1]
Japanese Patent Application Laid-Open Publication No. 2004-126972

SUMMARY OF INVENTION

Technical Problem

Additionally, according to above mentioned storage system, since each HDD 509 requires the power supply 507 (508), many power supplies 507 (508) are required.

As a method for solving for this problem, a method that makes common use of both a 12-volt power supply 507 and a 5-volt power supply 508 for multiple HDDs 509 is conceivable. However, by so doing, it becomes impossible to adhere to the HDD power feeding specifications (the allowable limit of error for both 12V and 5V) for 5V in particular. This is because, in general, the allowable limit of error for 5V is narrower than the allowable limit of error for 12V due to 5V being a lower voltage than 12V, and also because the longer the power supply line from the power supply to the HDD is, the more apt the voltage quality is to become lower due to the affects of voltage drop and the like resulting from the impedance of the wiring.

This problem can also occur in a case where another type of physical storage device (for example, a flash memory device) is mounted instead of an HDD.

Accordingly, an object of the present invention is to make it possible to reduce the number of power supply circuits mounted in a storage system, and, in addition, to adhere to the power feeding specifications of respective physical storage devices.

Solution to Problem

A storage system comprises multiple physical storage devices, and a power supply for the multiple physical storage devices. Each physical storage device is a device that requires the input of a first voltage, and the input of a second voltage that is lower than the first voltage. The power supply comprises a first power supply circuit that is made redundant, and a second power supply circuit that is made redundant. Each first power supply circuit outputs a first voltage that is input to the respective physical storage devices. Each second power supply circuit outputs a second voltage to a storage device group (two or more physical storage devices of the multiple physical storage devices), which, of the multiple physical storage devices, corresponds to this second power supply circuit. Each second power supply circuit is isolated from the circuit board of the first power supply circuit.

A storage device can be, for example, an HDD, an optical disk, non-volatile memory (e.g. flash memory, FeRAM (Ferro Electric Random Access Memory) and ReRAM (Resistive Random Access Memory), etc.). In a storage system, multiple types of storage devices can exist together.

BRIEF DESCRIPTION OF DRAWINGS

FIG. 23A shows power consumption in HDD units, and FIG. 23B shows power consumption in enclosure units.

DESCRIPTION OF EMBODIMENTS

Some embodiments of this invention are described below, referring to the attached figures. Note that, since a storage device group is considered a power supply boundary in those embodiments, a storage device group might be referred to as a "power supply boundary". Furthermore, the following description assumes each of the multiple storage devices installed in the storage system to be HDD.

EXAMPLE 1

Figure 3:
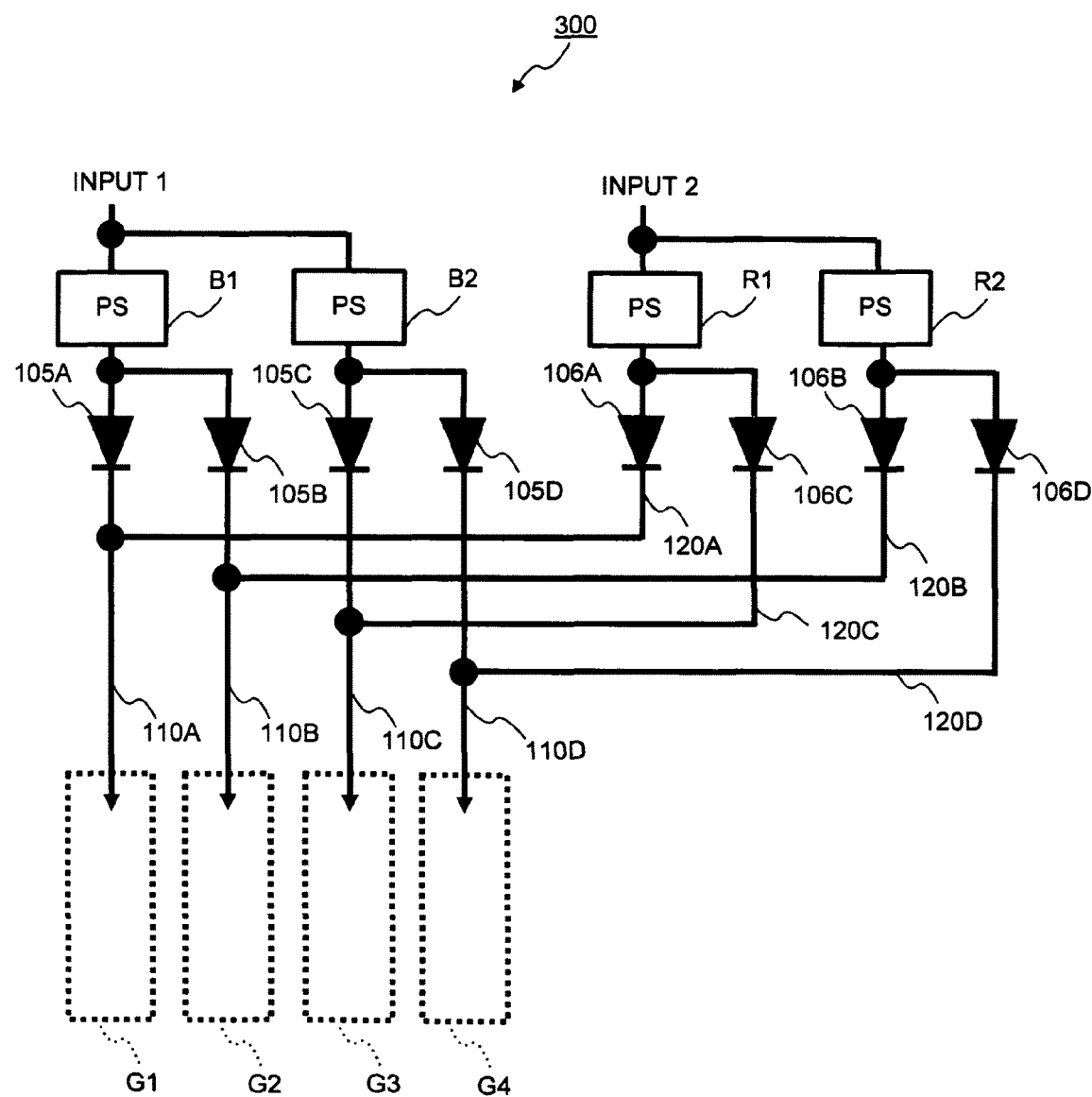
FIG. 3 shows the outline of the first embodiment of this invention.

FIG. 3 shows the outline of the first embodiment of this invention.

According to FIG. 3, as an example of multiple power supply boundaries which the storage system 300 (storage device group) has, four power supply boundaries G1 to G4 are shown. If the number of power supply boundaries is four, two first power supplies B1 and B2, and two second power supplies R1 and R2 are installed in the storage system.

The first power supply B1 is connected to the power supply boundary G1 (and G2) through the first path 110A (and 110B), and supplies the power based on the power from the input 1 to power supply boundaries G1 and G2. The first power supply B2 is connected to the power supply boundary G3 (and G4) through the first path 110C (and 110D), and supplies the power based on the power from the input 1 to power supply boundaries G3 and G4. Note that, in the first paths 110A, 110B, 110C and 110D, backflow prevention elemental devices (for example, diodes), which are 105A, 105B, 105C and 105D respectively, are installed. In addition, the input 1 and the input 2 are the upper power supplies (for example, commercial power or AC/DC converters).

The second power supply R1 is connected to the first path 110A (and 110C) through the second path 120A (and 120C), and is supposed to execute power feeding for the power supply boundary G1 and/or G3 in case of failure in the first power supply B1 and/or B2. The second power supply R2 is connected to the first path 110B (and 110D) through the second path 120B (and 120D), and is supposed to execute power feeding for the power supply boundary G2 and/or G4 in case of failure in the first power supply B1 and/or B2. As mentioned above, by the second power supplies R1 and R2 and the first power supplies B1 and B2, the power supply redundancy for the power supply boundaries G1 to G4 has been realized (i.e. the power feeding system has been made redundant in each power supply boundary G1 to G4). Note that, in the second paths 120A, 120B, 120C and 120D, backflow prevention elemental devices 106A, 106B, 106C and 106D respectively, are installed. In addition, instead of the configuration where each of the second paths is connected to some point in the first path, the configuration where the first path and the second path are connected to separate power supply boundaries can be adopted.

One of the characteristics of the power feeding part of the storage system shown in FIG. 3 is as follows. That is, to the power supply boundaries G1 and G3, which are the power feeding targets from a certain first power supply B1, power feeding is supposed to be executed not by the same second power supply R1 (or R2) but by the different second power supplies R1 and R2 respectively. Similarly, to the power supply boundaries G2 and G4, which are the power feeding targets from another first power supply B2, power feeding is supposed to be executed by the different second power supplies R1 and R2 respectively.

Furthermore, since power is supposed to be supplied from any of the power supplies B1, B2, R1 and R2 to two of the four power supply boundaries G1 to G4, supposing the power required for each of the power supply boundaries G1 to G4 is "1", the power supply capacity required for each of the power supplies B1, B2, R1 and R2 becomes "2", which is the total sum of the power required for two power supply boundaries that are the power feeding targets. That is, in this embodiment, the power supply capacity is equal in the power supplies B1, B2, R1 and R2.

By the configuration above, it is possible to realize the redundant power feeding system in each storage device group and make each storage device group into a power supply boundary, with the minimum number of power supplies.

The process of making the power feeding system of a storage device group redundant and making a storage device group a power supply boundary is described as follows.

Figure 4A:
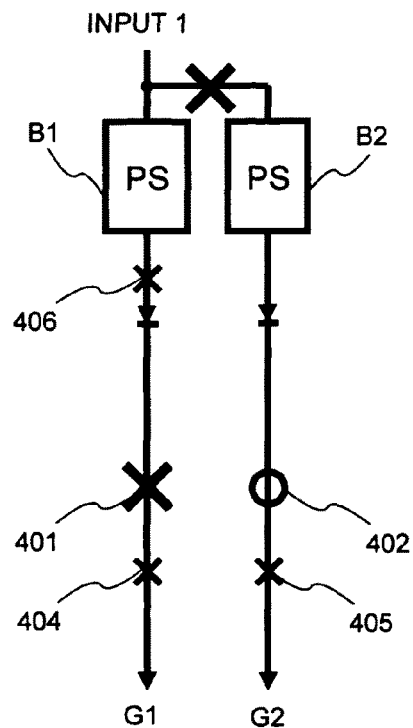
FIG. 4A shows a configuration example of the power feeding part where each power feeding system of two storage device groups is not made redundant.

For example, as shown in FIG. 4A, if the number of power supply boundaries is two and the power feeding system of each of the storage device groups G1 and G2 is not made redundant, and if a ground short (GND short) occurs in the power feeding path that connects the power supply B1 and the storage device group G1 (refer to 401), the power feeding from the power supply B1 is stopped (refer to 406), but the power feeding from another power supply B2 to the storage device group G2 is continued (refer to 402). That is, the storage device groups G1 and G2 are considered to be power supply boundaries.

However, if the power feeding from the input 1 to the power supplies B1 and B2 is stopped (refer to 403), the power feeding from the power supply B1 to the storage device group G1 and the power feeding from the power supply B2 to the storage device group G2 are also stopped (refer to 404 and 405). In addition, if the power feeding from the power supply B1 and B2 is stopped (for example, if the power feeding from the power supply B1 is stopped as shown by 406), the power feeding to the target storage device group (storage device group G1 according to the example of FIG. 4A) is also stopped.

Figure 4B:
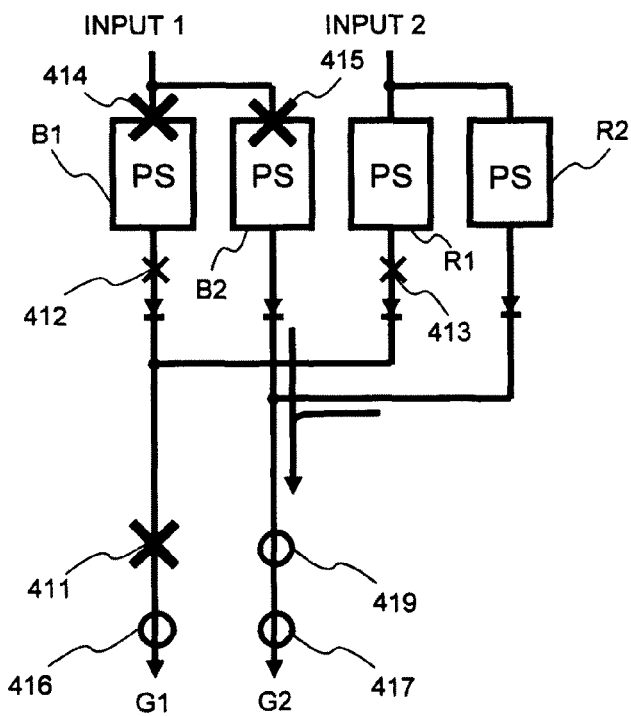
FIG. 4B shows a configuration example of the power feeding part where each power feeding system of two storage device groups is redundant.

Therefore, in order to make the power feeding system of each of the storage device groups G1 and G2 redundant, the configuration shown in FIG. 4B can be given as an example. That is, regarding the storage device group G1 (and G2), the power supply R1 (R2) is provided besides the power supply B1 (B2). Thus, even if the power feeding from both of the power supplies B1 and B2 is stopped due to such causes as failure in the input 1 or failure in the power supplies B1 and B2 (refer to 414 and 415), power is supplied from the power supply R1 (and R2) to the storage device group G1 (and G2) (refer to 416 and 417). Note that, if a GND short happens in the power feeding path that connects the power supply B1 and the storage device group G1 (refer to 411), not only the power feeding from the power supply B1 but the power feeding from the power supply R1 is also stopped (refer to 412 and 413), but the power feeding from the power supply B2 (or R2) to the storage device group G2 is maintained (refer to 419). That is, the storage device groups G1 and G2 are power supply boundaries, as the configuration shown in FIG. 4A.

According to the configuration of a power feeding part shown in FIG. 4B, it can be realized to both install redundant power feeding systems in the storage device groups G1 and G2 and make storage device groups G1 and G2 power supply boundaries. In addition, since B1, B2, R1 and R1 all require the same power supply capacity, one type of power supply is enough. However, the number of power supplies becomes more than the number of power supplies in the configuration shown in FIG. 4A.

Figure 5A:
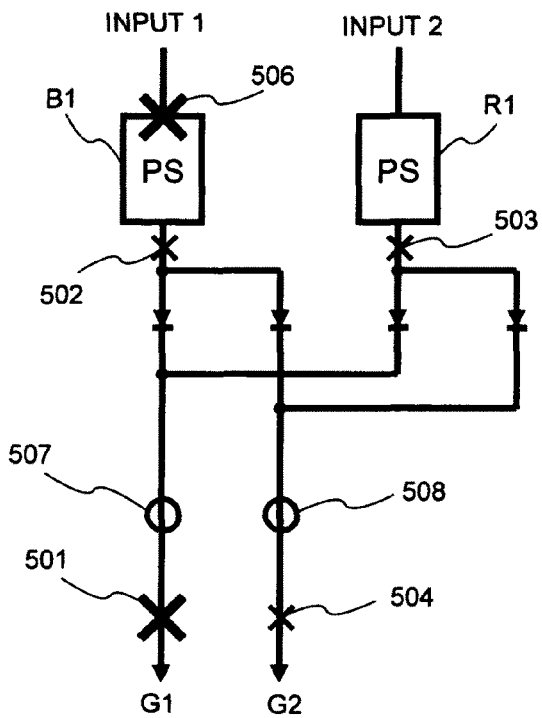
FIG. 5A shows a configuration example of the power feeding part where each of the two storage device groups is not made a power supply boundary.

On the other hand, for example, as shown in FIG. 5A, if the number of power supplies is two and the redundant power supplies B1 and R1 are installed for storage device groups G1 and G2 respectively, even if the power feeding from the power supply B1 is stopped (refer to 506), power is supplied from the power supply R1 to the storage device groups G1 and G2 (refer to 507 and 508). However, if a GND short occurs in the power feeding path that connects the power supply B1 and the storage device group G1 (refer to 501), not only the power feeding from the power supply B1 but the power feeding from the power supply R1 is also stopped (refer to 502 and 503). Therefore, the power feeding to the storage device group 2 is stopped (refer to 504). That means that the storage device groups G1 and G2 are not made power supply boundaries.

Figure 5B:
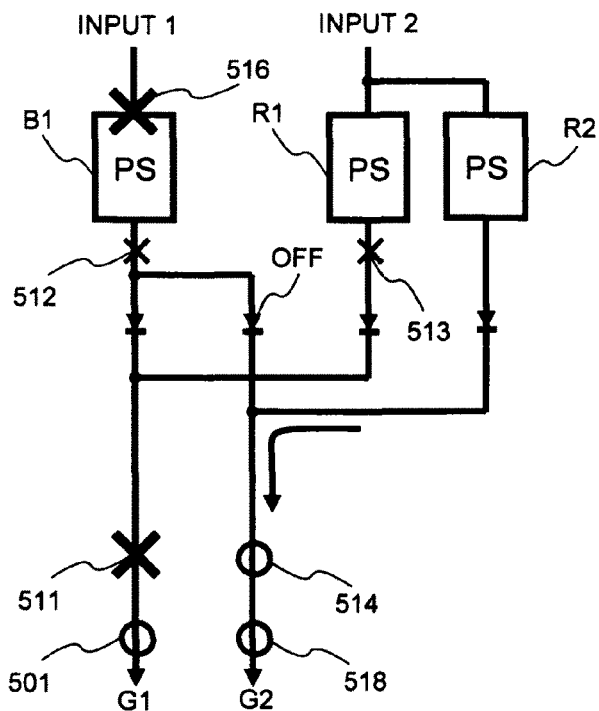
FIG. 5B shows a configuration example of the power feeding part where each of the two storage device groups is a power supply boundary.

Therefore, in order to make the storage device groups G1 and G2 power supply boundaries, for example, the configuration shown in FIG. 5B can be given as an example. That is, instead of the common power supply R1 for the storage device groups G1 and G2, separate power supplies R1 and R2 are adopted. Thus, even if a GND short happen in the power feeding path that connects the power supply B1 and the storage device group G1 (refer to 511) and not only the power feeding from the power supply B1 but the power feeding from the power supply R1 is also stopped (refer to 512 and 513), power is supplied from the power supply R2 to the storage device group G2 (refer to 514). Note that, if the power feeding from the power supply B1 is stopped (refer to 516), power is supplied from the power supply R1 (and R2) to the storage device group G1 (and G2) (refer to 517 (and 518)). That is, the power feeding system of the storage device groups G1 and G2 have been made redundant, as the configuration shown in FIG. 5A.

According to the configuration of a power feeding part shown in FIG. 5B, it can be realized to both install redundant power feeding systems in the storage device groups G1 and G2 and make storage device groups G1 and G2 power supply boundaries. Furthermore, the number of power supplies is smaller than the number of power supplies in the configuration shown in FIG. 4B. However, as the power supply capacity required by the power supply B1 and the power supply capacity required by the power supplies R1 and R2 respectively are different, multiple types of power supplies are required.

In this embodiment, in order to realize both "redundancy of the power feeding system" and "power supply boundary", according to the characteristic described by referring to FIG. 3 (the configuration where, to two or more storage device groups that receive power feeding from a certain first power supply, power feeding is executed from separate second power supplies), the minimum number of power supplies can be expressed in the following formula:

Number of power supplies=2 times(square root of $q$)     (1)

In this case, $q$ indicates an integer larger than one and it is the number of power supply boundaries. The "square root of $q$" indicates the square root of $q$. The part after the decimal point in {2 times(square root of $q$)} is rounded up. In addition, in this embodiment, as the power feeding system of each power supply boundary is duplicated, the coefficient of square root of $q$ is "2", but the coefficient of square root of $q$ is n if the power feeding system of each power supply boundary is replicated n times (n is an integer larger than two).

By referring to FIGS. 6A to 9B, the relation between the number of storage device groups and the number of power supplies where the characteristic described by referring to FIG. 3 is adopted. Note that, in FIGS. 6A to 9B, the x mark on a certain power feeding path (x mark beside the power supply boundary (storage device group)) indicates that a GND short has occurred there, and the O mark on the remaining power feeding paths indicate that, in spite of the GND short in one path, the power feeding continues there.

Considering the following description, if the above-mentioned characteristic is adopted, the minimum number of power supplies results in the value of the above-mentioned formula (1).

Figure 6A:
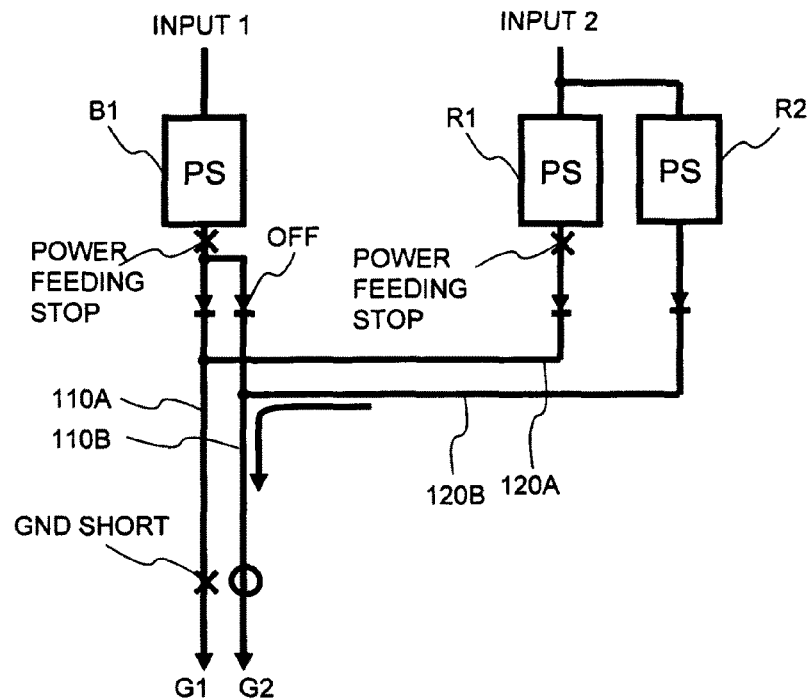
FIG. 6A shows a configuration comprised of the minimum number of power supplies when the number of power supply boundaries is two.

For example, if the number of power supply boundaries is two, the configuration shown in FIG. 6A (the same configuration as the one shown in FIG. 5B) is adopted. That is, power is supplied from the first power supply B1 through the first paths 110A and 110B to two power supply boundaries G1 and G2. To those two power supply boundaries G1 and G2, power is supposed to be supplied from the different second power supplies R1 and R2 through the second paths 120A and 120B respectively. Considering the above-mentioned configuration, if the number of power supply boundaries is two, the minimum number of power supplies is three. According to the formula (1) above:

2 times(square root of(number of power supply boundaries))=2 times(square root of 2)=Approx. 2.82.

By rounding up the part after the decimal point of the value above, the number of power supplies is three, as mentioned above.

Figure 6B:
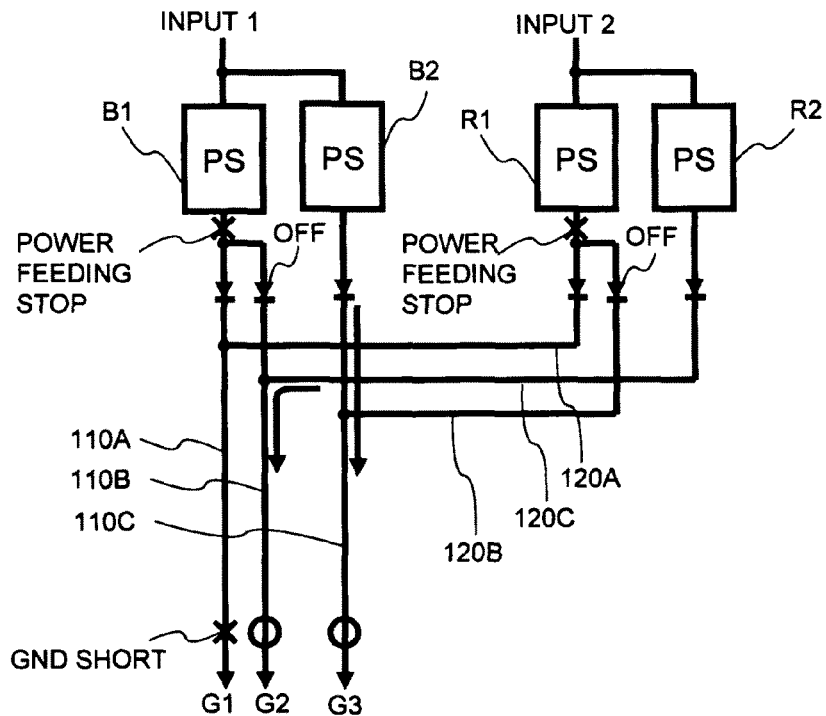
FIG. 6B shows a configuration comprised of the minimum number of power supplies when the number of power supply boundaries is three.

If the number of power supply boundaries is three, the configuration shown in FIG. 6B is adopted. That is, power is supplied to the two power supply boundaries G1 and G2 from the first power supply B1 through the first paths 120A and 120B respectively. To those two power supply boundaries G1 and G2, power is supposed to be supplied from the different second power supplies R1 and R2 through the second paths 120A and 120B respectively. As the power feeding target of the first power supply B2 is a single power supply boundary G2 only, power feeding is executed from a single second power supply R1 (or R2) through the second path 120C to the power supply boundary G2. Considering the above-mentioned configuration, if the number of power supply boundaries is three, the minimum number of power supplies is four. According to the formula (1) above:

2 times(square root of(number of power supply boundaries))=2 times(square root of 3)=Approx. 3.46.

By rounding up the part after the decimal point of the value above, the minimum number of power supplies is four, as mentioned above.

According to the characteristics by referring to FIG. 3 (i.e. according to the formula (1) above), if the number of power supply boundaries is four or more, the minimum number of power supplies is less than or equal to the number of power supply boundaries.

Figure 7A:
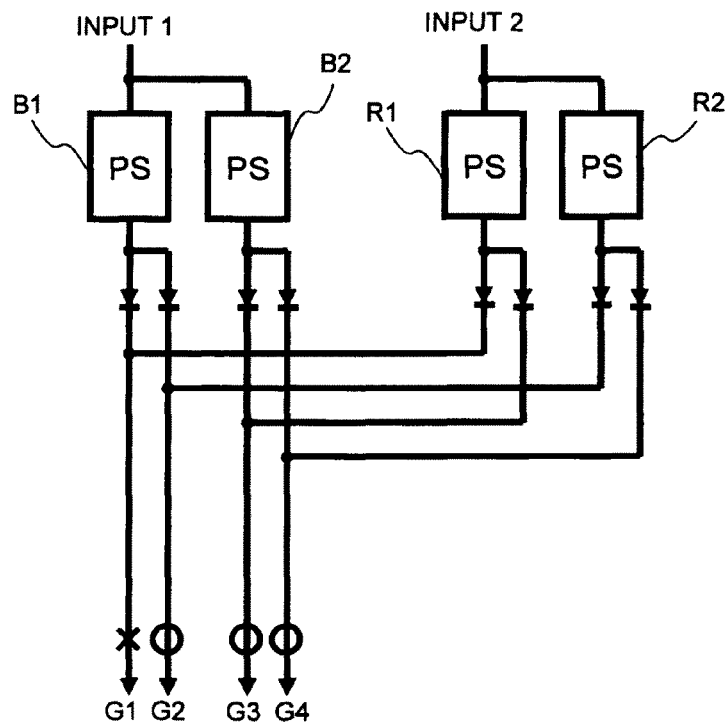
FIG. 7A shows a configuration comprised of the minimum number of power supplies when the number of power supply boundaries is four.

For example, if the number of power supply boundaries is four, the configuration shown in FIG. 7A is adopted. To this configuration, the description by referring to FIG. 3 applies. According to the formula (1) above:

2 times(square root of(number of power supply boundaries))=2 times(square root of 4)=4.

Figure 7B:
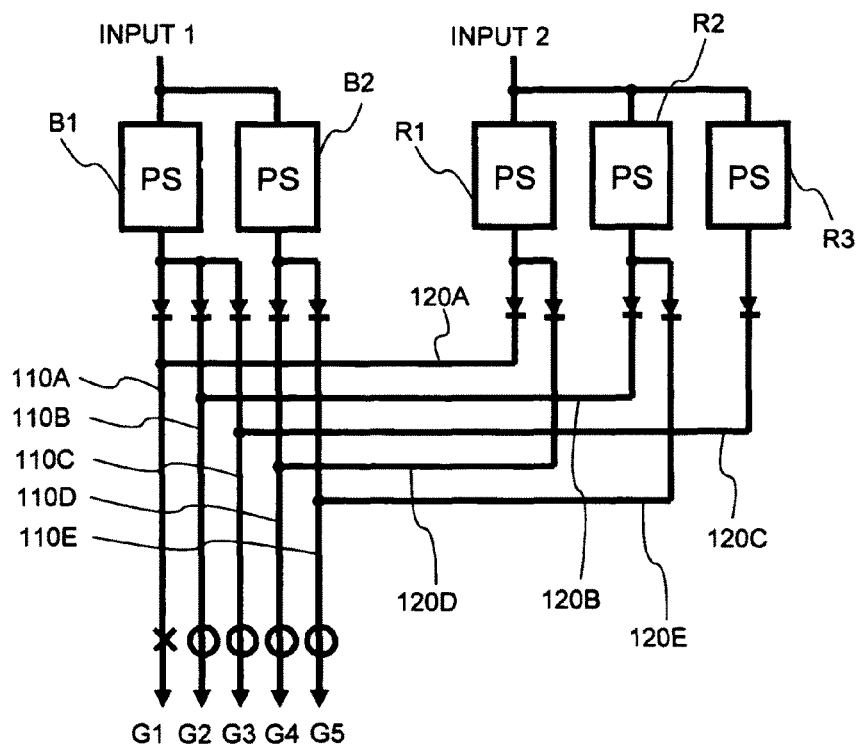
FIG. 7B shows a configuration comprised of the minimum number of power supplies when the number of power supply boundaries is five.

If the number of power supply boundaries is five, the configuration shown in FIG. 7B is adopted. That is, power is supplied from the first power supply B1 through the first paths 110A, 110B and 110C to three power supply boundaries G1, G2 and G3 respectively. To those three power supply boundaries G1, G2 and G3, power is supposed to be supplied from the different second power supplies R1, R2, and R3 through the second paths 120A, 120B and 120C respectively. To the two power supply boundaries G4 and G5 to which power feeding is executed from the second power supply B2 through the first paths 110D and 110E respectively, power feeding is executed from the different second power supplies R1 and R2 through the second paths 120D and 120E. Considering the above-mentioned configuration, if the number of power supply boundaries is five, the minimum number of power supplies is five. According to the formula (1) above:

2 times(square root of(number of power supply boundaries))=2 times(square root of 5)=Approx. 4.47.

By rounding up the part after the decimal point of the value above, the number of power supplies is five, as mentioned above.

Figure 8A:
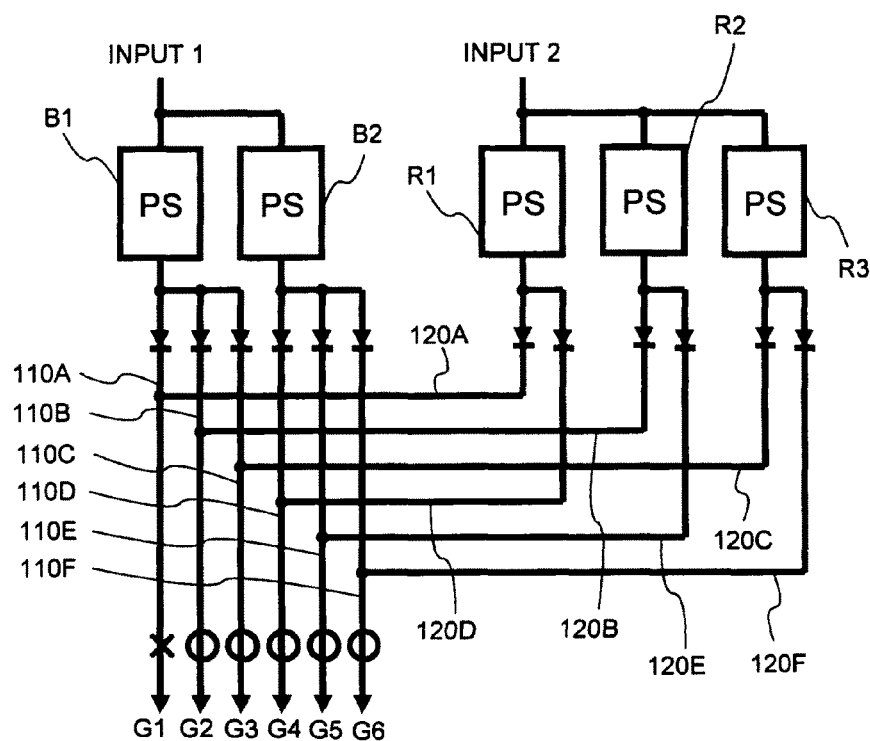
FIG. 8A shows a configuration comprised of the minimum number of power supplies when the number of power supply boundaries is six.

If the number of power supply boundaries is six, the configuration shown in FIG. 8A is adopted. That is, power is supplied from the first power supply B1 through the first paths 110A, 110B and 110C to three power supply boundaries G1, G2 and G3 respectively. To those three power supply boundaries G1, G2 and G3, power is supposed to be supplied from the different second power supplies R1, R2, and R3 through the second paths 120A, 120B and 120C respectively. To the three power supply boundaries G4, G5 and G6 to which power feeding is executed from the second power supply B2 through the first paths 110D, 110E and 110F respectively, power feeding is executed from the different second power supplies R1, R2, and R3 through the second paths 120D, 120E and 120F. Considering the above-mentioned configuration, if the number of power supply boundaries is six, the minimum number of power supplies is five. According to the formula (1) above:

2 times(square root of(number of power supply boundaries))=2 times(square root of 6)=Approx. 4.89.

By rounding up the part after the decimal point of the value above, the number of power supplies is five, as mentioned above.

Figure 8B:
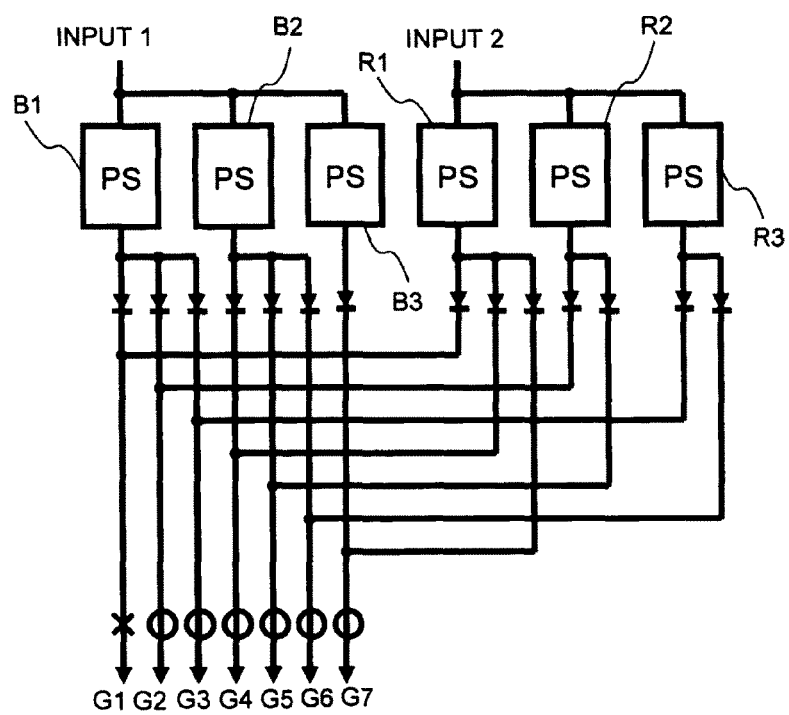
FIG. 8B shows a configuration comprised of the minimum number of power supplies when the number of power supply boundaries is seven.

If the number of power supply boundaries is seven, the configuration shown in FIG. 8B is adopted. That is, if the number of power supply boundaries is six, the minimum number of power supplies is five. According to the formula (1) above:

2 times(square root of(number of power supply boundaries))=2 times(square root of 6)=Approx. 4.89.

By rounding up the part after the decimal point of the value above, the minimum number of power supplies is five, as mentioned above.

Figure 9A:
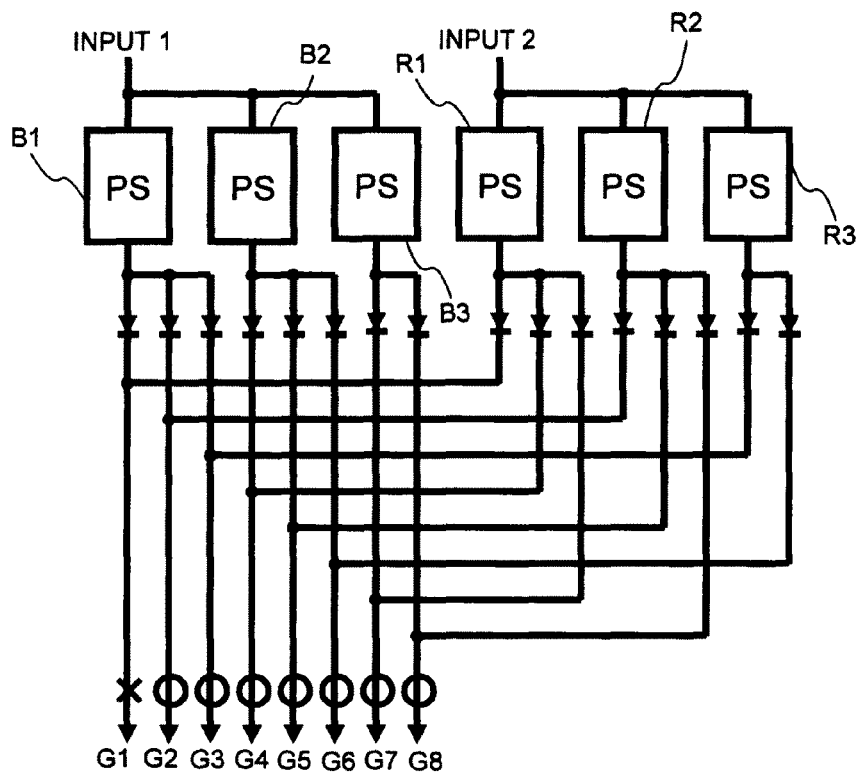
FIG. 9A shows a configuration comprised of the minimum number of power supplies when the number of power supply boundaries is eight.

If the number of power supply boundaries is eight, the configuration shown in FIG. 9A is adopted. That is, if the number of power supply boundaries is eight, the minimum number of power supplies is six. According to the formula (1) above:

2 times(square root of(number of power supply boundaries))=2 times(square root of 8)=Approx. 5.66.

By rounding up the part after the decimal point of the value above, the minimum number of power supplies is six, as mentioned above.

Figure 9B:
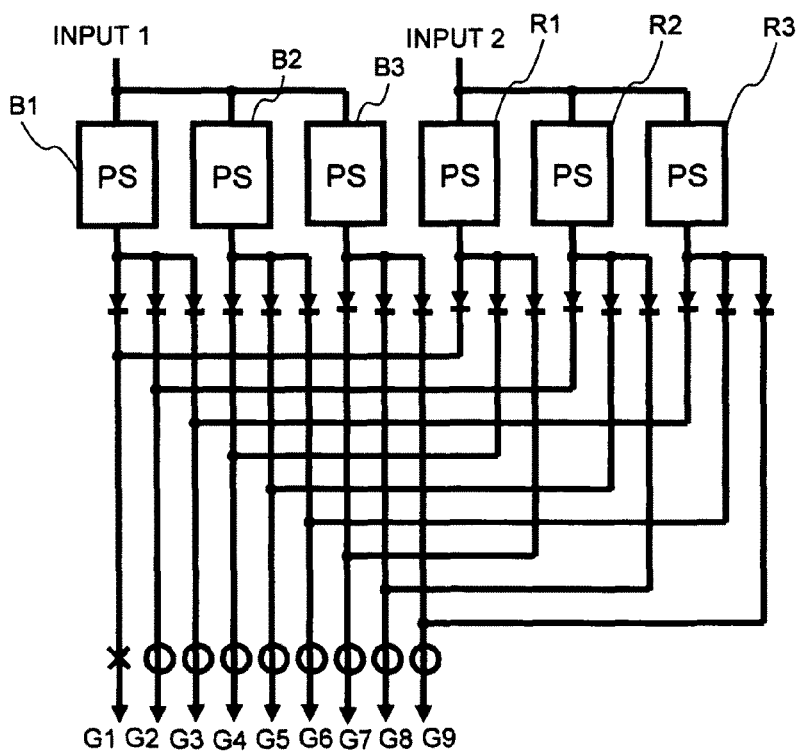
FIG. 9B shows a configuration comprised of the minimum number of power supplies when the number of power supply boundaries is nine.

If the number of power supply boundaries is nine, the configuration shown in FIG. 9B is adopted. That is, if the number of power supply boundaries is nine, the minimum number of power supplies is six. According to the formula (1) above:

2 times(square root of(number of power supply boundaries))=2 times(square root of 9)=6.

As above, the configuration of the power feeding part has been shown in FIGS. 6A to 9B by giving the examples where the number of power supply boundaries is two to nine respectively.

The reason why the above-mentioned configuration is adopted according to the number of power supply boundaries is described by referring to FIGS. 10A to 14B. Note that, in FIGS. 10A to 14B, the figures in bold italic stated beside the power supplies indicate the power supply capacity (amount of stored power) where "1" is specified as the amount of power required for a power supply boundary.

The easiest way of making each storage device group a power supply boundary and at the same time making the power supply of each storage device group redundant is adding two power supplies each time the number of power supply boundaries is increased by one.

Figure 10A:
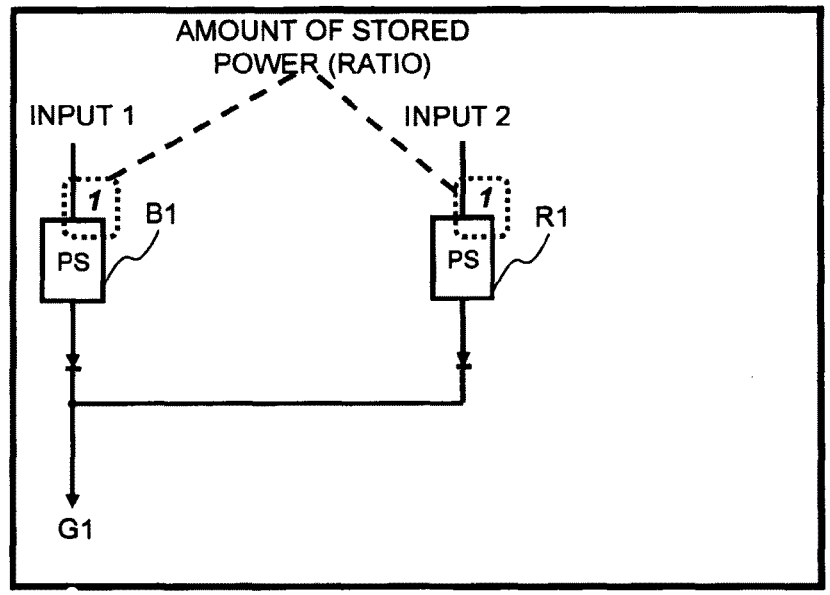
FIG. 10A shows a configuration of a power feeding part where a redundant power supply is installed in each storage device group, and the number of power supply boundaries is one.

Concretely, for example, as shown in FIG. 10A, if the number of power supply boundaries is one, for that one power supply boundary G1, redundant power supplies B1 and R1 are installed.

Figure 10B:
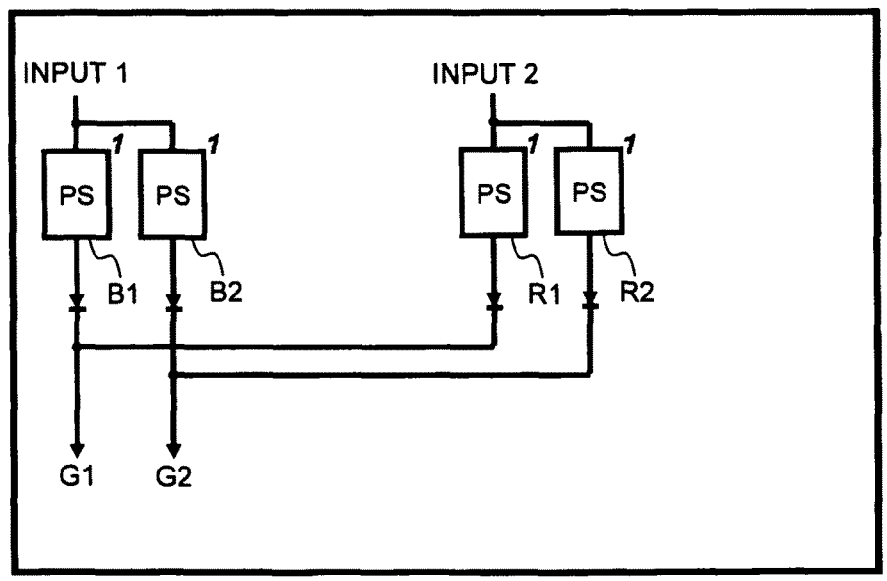
FIG. 10B shows a configuration of a power feeding part where a redundant power supply is installed in each storage device group, and the number of power supply boundaries is two.
Figure 11A:
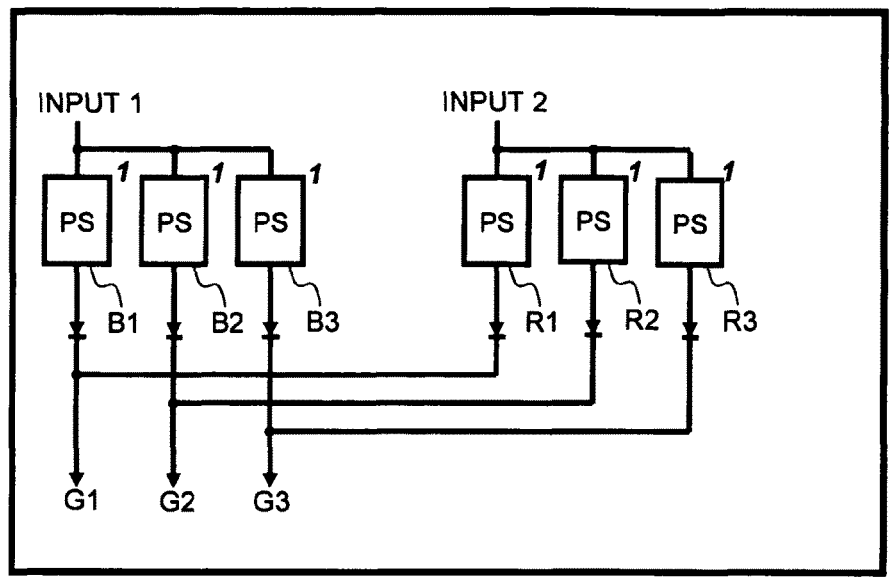
FIG. 11A shows a configuration of a power feeding part where a redundant power supply is installed in each storage device group, and the number of power supply boundaries is three.
Figure 11B:
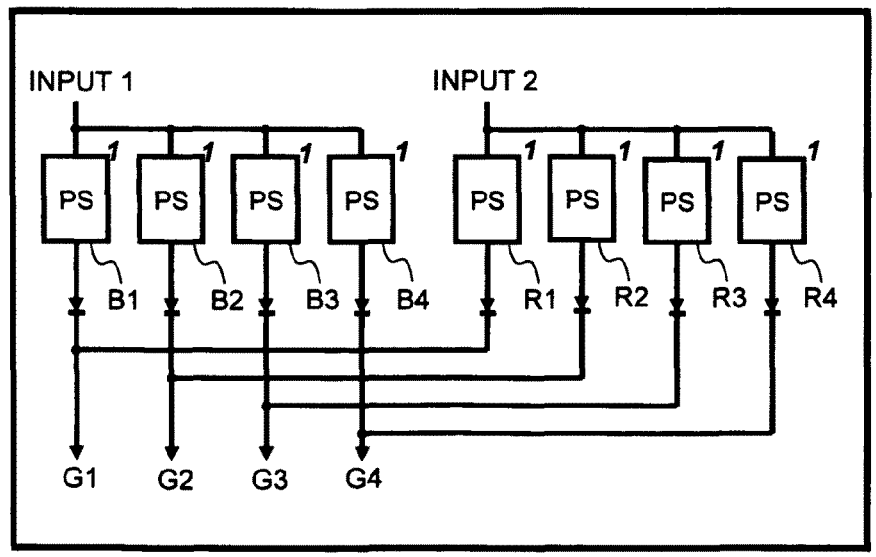
FIG. 11B shows a configuration of a power feeding part where a redundant power supply is installed in each storage device group, and the number of power supply boundaries is four.

As shown in FIG. 10B, the number of power supply boundaries increases to two, for the added power supply boundary G2, the redundant power supplies B2 and R2 are installed. As shown in FIG. 10C, the number of power supply boundaries increases to three, for the added power supply boundary G3, the redundant power supplies B3 and R3 are installed. As shown in FIG. 10D, if the number of power supply boundaries increases to four, for the added power supply boundary G4, the redundant power supplies B4 and R4 are installed.

According to one of the above-mentioned characteristics of this embodiment, power is supplied from the first power supply through N first paths to N power supply boundaries, and to those N power supply boundaries, power is configured to be supplied from different N second power supplies through N second paths (N is an integer larger than one). Additionally, the inputs of the first power supply and the second power supply are configured in separate series.

Figure 12A:
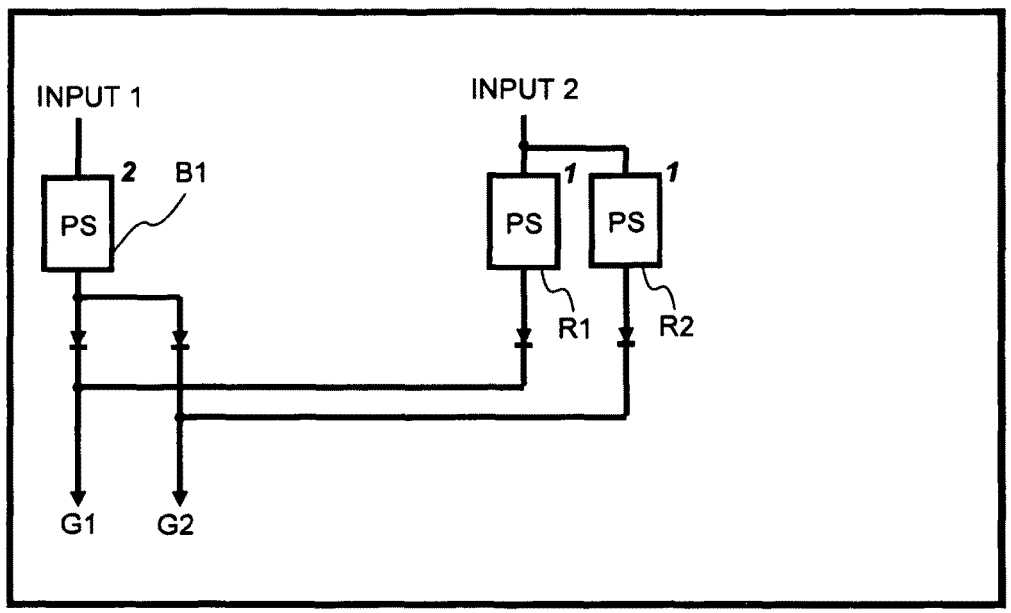
FIG. 12A shows a configuration of a power feeding part where the power supplies B1 and B2 in FIG. 10B are compiled into one power supply B1.
Figure 12B:
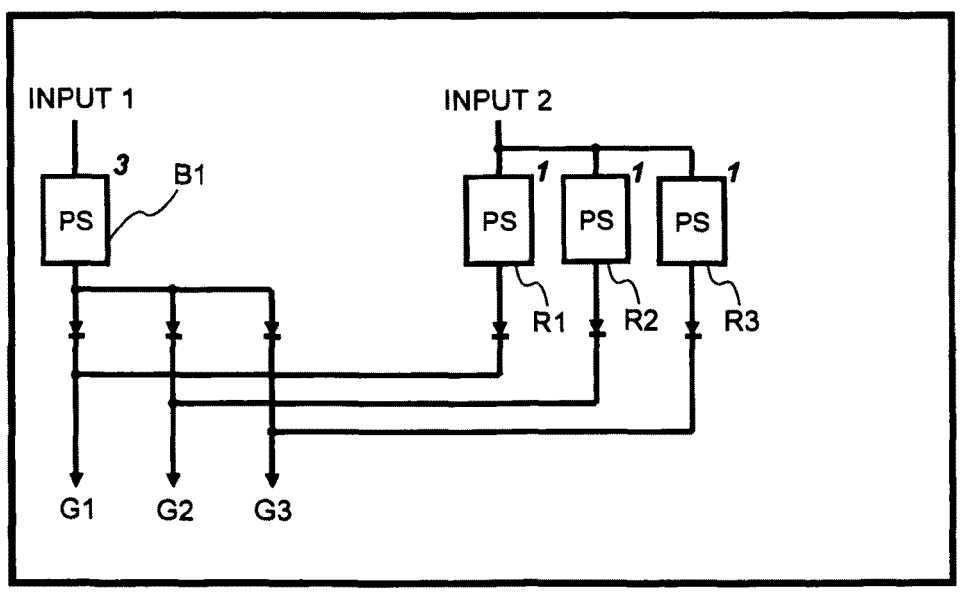
FIG. 12B shows a configuration of a power feeding part where the power supplies B1 to B3 in FIG. 11A are compiled into one power supply B1.
Figure 13A:
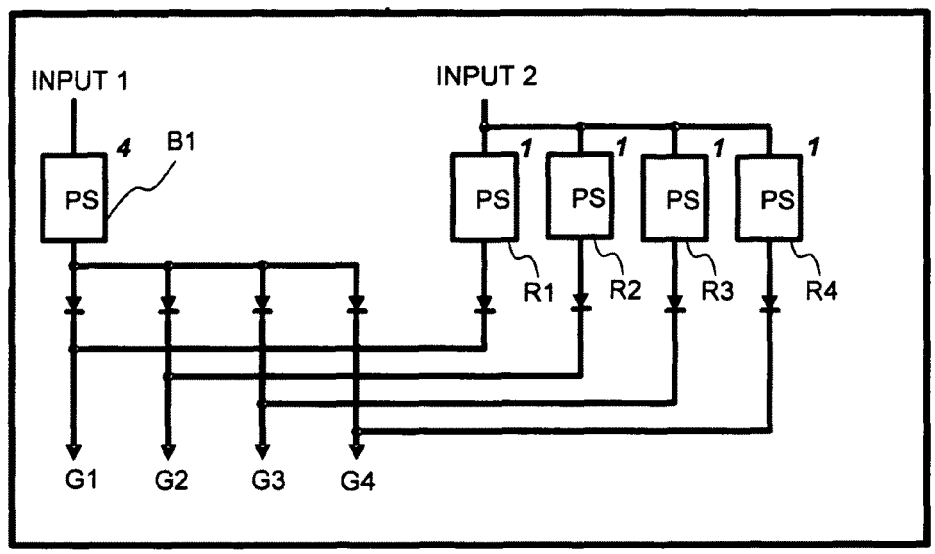
FIG. 13A shows a configuration of a power feeding part where the power supplies B1 to B4 in FIG. 11B are compiled into one power supply B1.

Therefore, if the number of power supply boundaries is two to four and the first power supplies are compiled into one so power will be supplied from that one compiled first power supply to all the power supply boundaries, the configuration of the power feeding part is as shown in FIGS. 12A to 13A. That is, if the number of power supply boundaries is two, power is supplied as shown in FIG. 12A from one first power supply B1 to two power supply boundaries G1 and G2, and to those two power supply boundaries G1 and G2, power is supplied from two different second power supplies R1 and R2 respectively. If the number of power supply boundaries is three, power is supplied as shown in FIG. 12B from one first power supply B1 to three power supply boundaries G1 to G3, and to those three power supply boundaries G1 to G3, power is supplied from three different second power supplies R1 to R3 respectively. If the number of power supply boundaries is four, power is supplied as shown in FIG. 13A from one first power supply B1 to four power supply boundaries G1 to G4, and to those four power supply boundaries G1 to G4, power is supplied from four different second power supplies R1 to R4 respectively. According to the configuration shown in FIGS. 12A to 13A, in the cases where the number of power supply boundaries is two to four, the number of power supplies can be reduced from the number of power supplies shown in FIGS. 10B to 11B respectively.

According to FIGS. 12A to 13A, the required number of second power supplies is the maximum number of first paths that the power supplied by one first power supply passes (i.e. first paths corresponding to one first power supply). Therefore, if it is possible to reduce the maximum number of first paths corresponding to one first power supply, the number of second power supplies can be reduced.

Based on the above-mentioned perspective, as for the cases where the number of power supply boundaries is three to four, the power supplies can be compiled as follows.

Figure 13B:
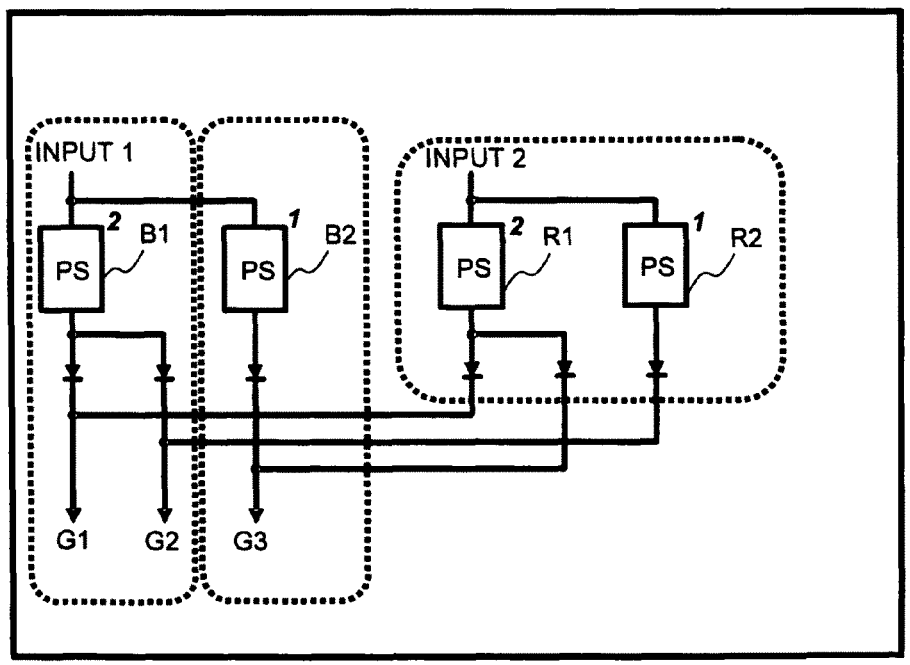
FIG. 13B shows a configuration of a power feeding part where the power supplies R1 to R3 in FIG. 12B are reduced to power supplies R1 and R2.

That is, if the number of power supply boundaries is three, as shown in FIG. 13B, the number of first paths corresponding to the first power supply B1 is reduced from three to two, and consequently, the first power supply B2 is provided so that power feeding will be executed from the first power supply B2 through one first path to the power supply boundary G3. This enables the number of second power supplies to be reduced from three to two. That is, power feeding is executed from the different second power supplies R1 and R2 to the power supply boundaries G1 and G2 which are the power feeding targets from the first power supply B1 respectively, and to the remaining power supply boundary G3, power feeding is executed from the second power supply R1.

Figure 14A:
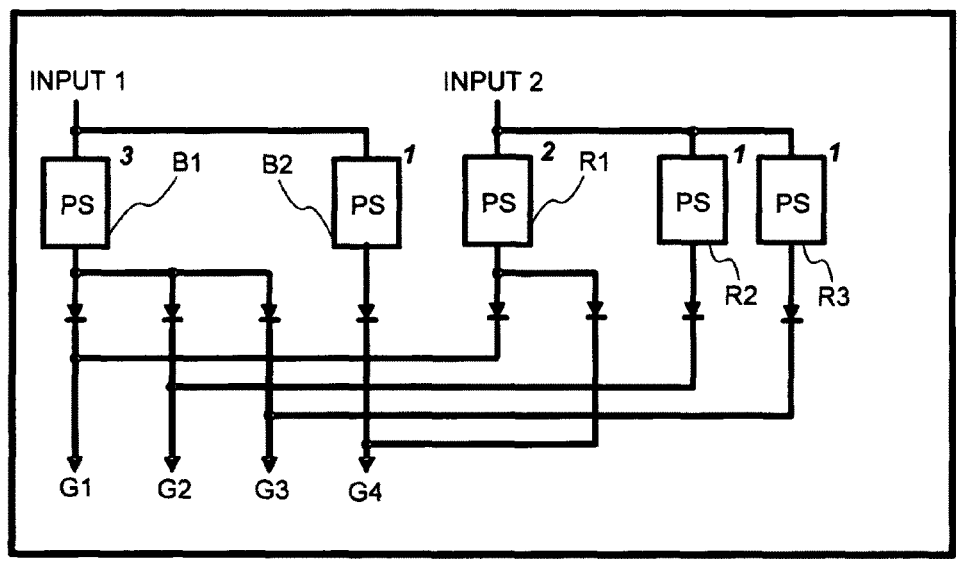
FIG. 14A shows a configuration of a power feeding part where the power supplies R1 to R4 in FIG. 13A are reduced to power supplies R1, R2 and R3.

If the number of power supply boundaries is four, as shown in FIG. 14A, the number of first paths corresponding to the first power supply B1 is reduced from four to three, and consequently, the first power supply B2 is provided so that power feeding will be executed from the first power supply B2 through one first path to the power supply boundary G4. This enables the number of second power supplies to be reduced from four to three. That is, power feeding is executed from the different second power supplies R1 to R3 to the power supply boundaries G1 to G3 which are the power feeding targets from the first power supply B1, and to the remaining power supply boundary G4, power feeding is executed from the second power supply R1.

Figure 14B:
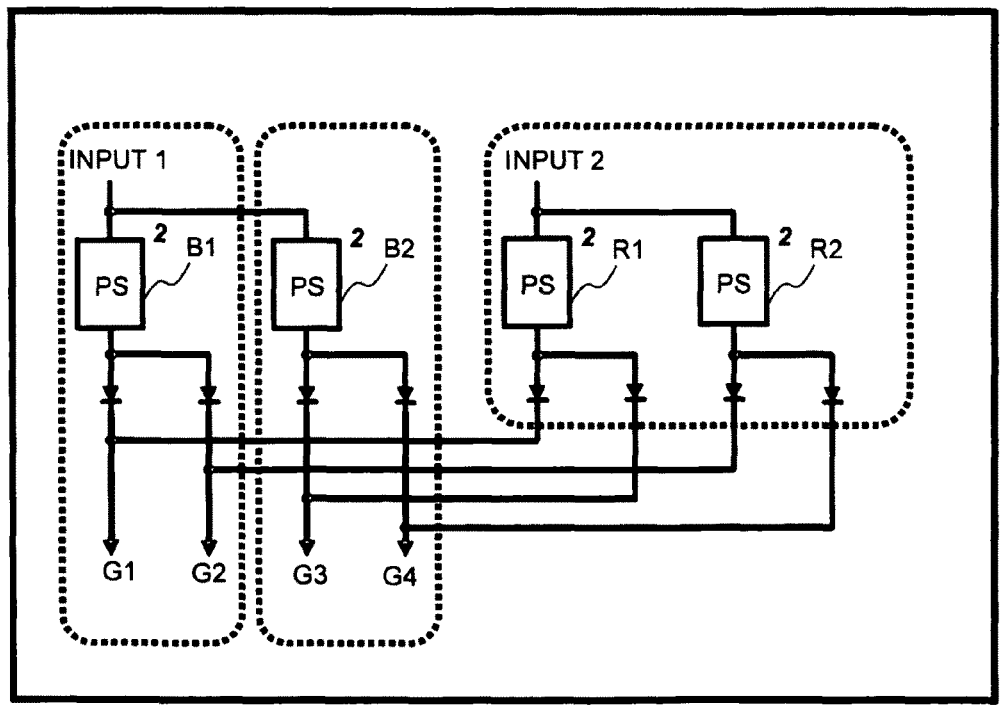
FIG. 14B shows a configuration of a power feeding part where the power supplies R1 to R3 in FIG. 14A are reduced to power supplies R1 and R2.

If the number of power supply boundaries is four, as shown in FIG. 14B, power supplies can be compiled to be even fewer. That is, the number of first paths corresponding to the first power supply B1 is reduced from three to two, and consequently, the number of first paths corresponding to the first power supply B2 is increased from one to two. Power feeding is executed from the first power supply B2 through two first paths to the power supply boundaries G3 and G4. This enables the number of second power supplies to be reduced from three to two. That is, from the different second power supplies R1 and R2, power is supplied to the power supply boundaries G1 and G2 which are the power feeding targets from the first power supply B1 respectively, and to the remaining power supply boundaries G3 and G4, power feeding is executed from the different second power supplies R1 and R2 respectively. According to the configuration shown in FIG. 14B, the number of power supplies is supposed to be reduced from five to four.

Note that, according to FIG. 14B, the power supply capacity of the power supplies B1, B2, R1 and R2 is "2" respectively, which is the sum of the power required for the two power supply boundaries that are the power feeding targets of each power supply. That is, the power supply capacity can be the same through the power supplies B1, B2, R1 and R2. Therefore, one type of power supply is enough for multiple storage device groups.

To keep the number of power supplies as small as possible, and at the same time, to make one type of power supply enough, it is desirable that, in the formula (1) above, the number of power supply boundaries q should be the square of p (p is an integer larger than one). For example, in case of q=9, the power feeding part can be configured as shown in FIG. 9B, and according to that configuration, the power supply capacity of power supplies B1, B2, B3, R1, R2 and R3 is "3" each, supposing the power required for the power supply boundaries is "1". That is, only one type of power supply is enough for the power supply boundaries G1 to G9.

Figure 15:
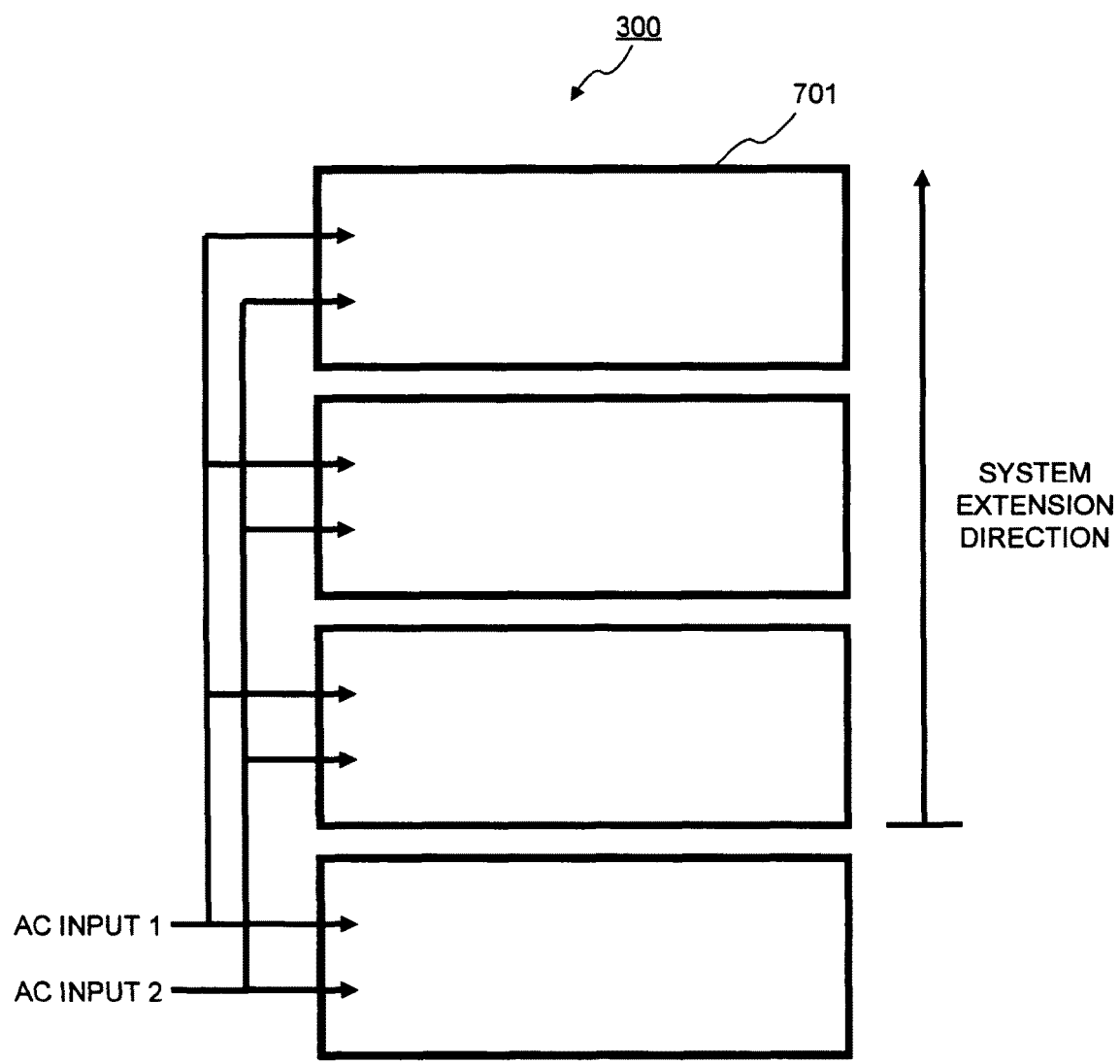
FIG. 15 shows the outline of the configuration of the storage system 300 related to the first embodiment.

The concrete example of the configuration of a storage system related to the first embodiment is described as follows. Note that, in the description below, FIG. 15 shows the outline of the configuration of the storage system 300 related to the first embodiment.

The storage system 300 can be configured of one or more enclosures 701. The enclosure 701 can be added or reduced. To each enclosure 701, power feeding is executed from the AC (alternate current) input 1 and the AC input 2. The AC inputs 1 and 2 are, for example, commercial power supplies respectively.

Figure 16:
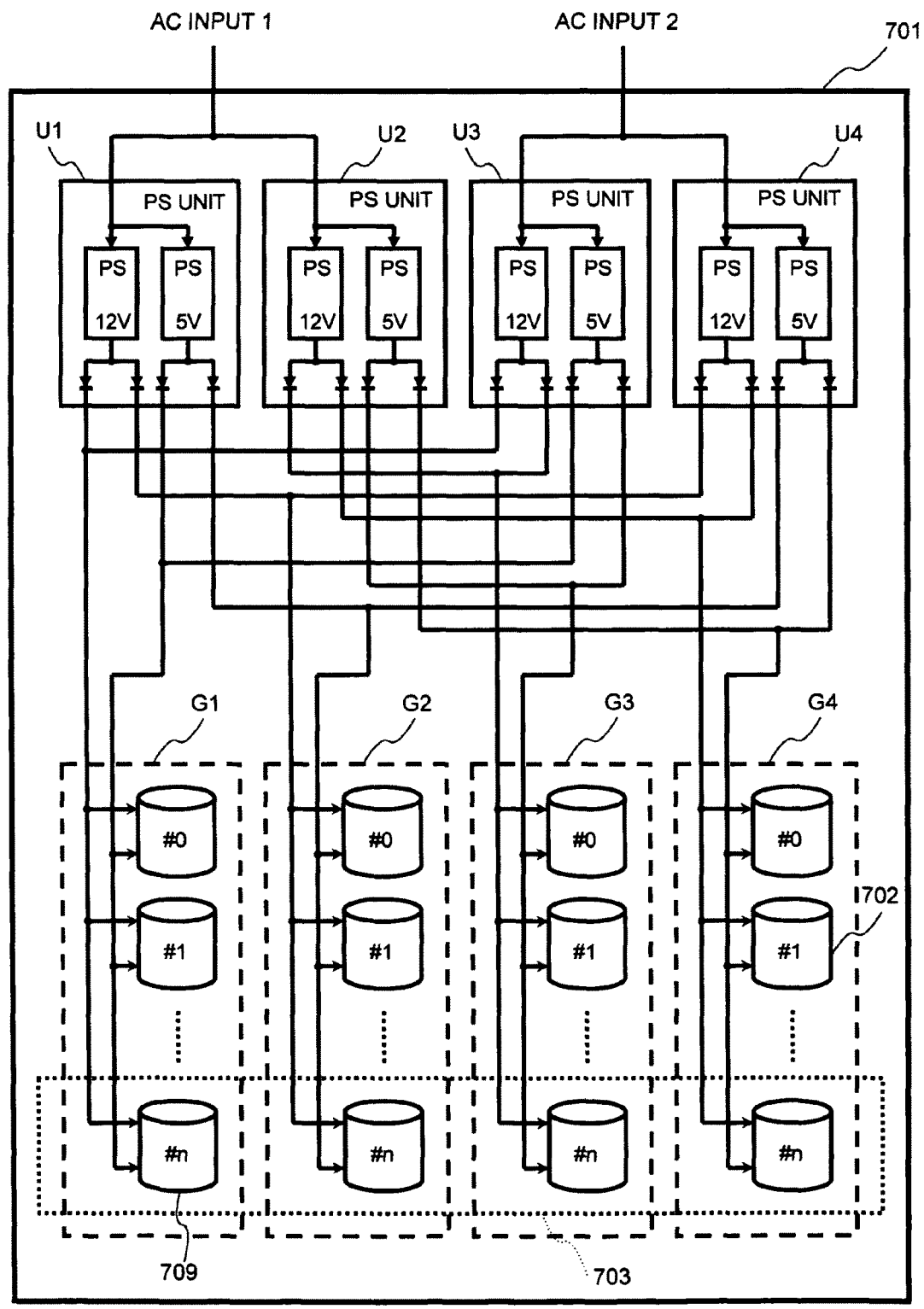
FIG. 16 shows the details of the configuration of a power feeding part in a enclosure 701 which the storage system 300 has.

FIG. 16 shows the details of the power feeding part in a enclosure 701 that the storage system 300 has.

The storage system 300 has a controller (not illustrated) and multiple HDDs 702. In a enclosure 701, a controller and multiple HDDs 702 can all or partly be installed, or the absence of a controller is also accepted. The controller, receiving an input/output request with a specification of a logical volume from an external system that is not illustrated (e.g. a host computer or another storage system), follows the input/output request, and writes data in or reads data from the HDD 702 that is the foundation of the specified logical volume. A logical volume is created based on all the HDDs 702 that comprise a RAID (Redundant Array of Independent (or Inexpensive) Disks) group 703. A RAID group is also called an ECC (Error Correcting Code) group or a parity group. In a RAID group, data is stored according to a specified RAID level.

In a enclosure 701, for example, four power supply boundaries (storage device groups) G1 to G4 are installed. Each of the power supply boundaries G1 to G4 is comprised of two or more HDDs 702. As shown in FIG. 16, a RAID group 703 is comprised of the HDDs 702 that are included in each of the different power supply boundaries G1 to G4 (in the illustrated example, a so-called 3D+1P RAID group is configured for example). That is, the RAID group 703 is located over multiple power supply boundaries G1 to G4. Note that a RAID group 703 can be located over multiple enclosure 701 (for example, a RAID group can be configured of HDDs included in the power supply boundaries G1 to G4 respectively and HDDs included in the power supply boundaries of other enclosure).

The number of HDDs that the power supply boundaries G1 to G4 have respectively and the power consumption by each HDD are the same. Therefore, the power required by the power supply boundaries G1 to G4 is the same.

Four power supply units U1 to U4 are installed because the number of power supply boundaries is four and the configuration shown in FIG. 14B is adopted. Additionally, in each of the power supply units U1 to U4, as the first power supply or the second power supply, a set of high voltage power supply and a low voltage power supply, more concretely, for example, a set of a 12-volt supply and a 5-volt supply, is installed. 12 volt (and 5 volt) is the voltage generally required by HDDs. Power feeding is executed from a 12-volt power supply (and a 5-volt power supply) in the power supply unit U1 to the power supply boundaries G1 and G2 (concretely, all the HDDs 702 in the power supply boundary), and to those power supply boundaries G1 and G2, power feeding is executed from 12-volt power supplies (and 5-volt power supplies) in different power supply units U3 and U4. Either one of the 12-volt power supply or the 5-volt power supplies can be absent from the power supply unit.

In this embodiment, as mentioned above, at least the number of power supplies (12-volt power supplies and/or 5-volt power supplies) that can be calculated through the formula (1) above is provided. For each power supply, one series of input and one or more series of power feeding paths are provided. In each power feeding path, a backflow prevention elemental device (for example, a diode) is installed. Then multiple power supplies are divided for the input 1 series (AC input 1) and for the input 2 series (AC input 2), for each power supply group, as many power feeding paths as power supply boundaries (first path and second path) are installed. From the power supplies (12-volt and 5-volt power supplies) in the power supply unit U1 (U2) that supplies power based on the power from the input 1 series, power is supplied through two first paths to two power supply boundaries, and to those two power supply boundaries, from the power supplies (12-volt and 5-volt power supplies) in the power supply unit U3 (U4) that supplies power based on the power from the input 1 series, power is supplied through two second paths to two power supply boundaries.

In this embodiment, as the input 1 series and the input 2 series are AC inputs, the power supplies in each power supply unit is AC/DC (direct current) power supply (AC/DC converter). Note that the input of the power supply in each power supply unit can also be DC input, and in such a case, the power supply in each power supply unit can be DC/DC power supply (DC/DC converter).

With the configuration shown in FIG. 16, a RAID group is configured in a enclosure 701. Therefore, for example, in a storage system with a small number of HDDs, the number of enclosure 701 can be optimized, and thus the realization of a small-scale storage system can be expected. Furthermore, even on a small scale, the affected range (blocked range) in an HDD due to failures such as motherboard short can be limited, and thus a highly reliable storage system can be expected.

In addition, with the configuration shown in FIG. 16, the power supplies in the power supply units are AC/DC power supplies, and no DC/DC power supplies are required. This keeps the power feeding part inexpensive as well as reduces the frequency of power conversion, which will expectedly reduce waste of power.

Furthermore, with the configuration shown in FIG. 16, the minimum number of power supplies can both make power supplies for each storage device group redundant and configure the desired number of power supply boundaries. Concretely, if the number of power supply boundaries is four or more, both of them can be realized with fewer power supplies than the number of power supply boundaries.

Figure 17:
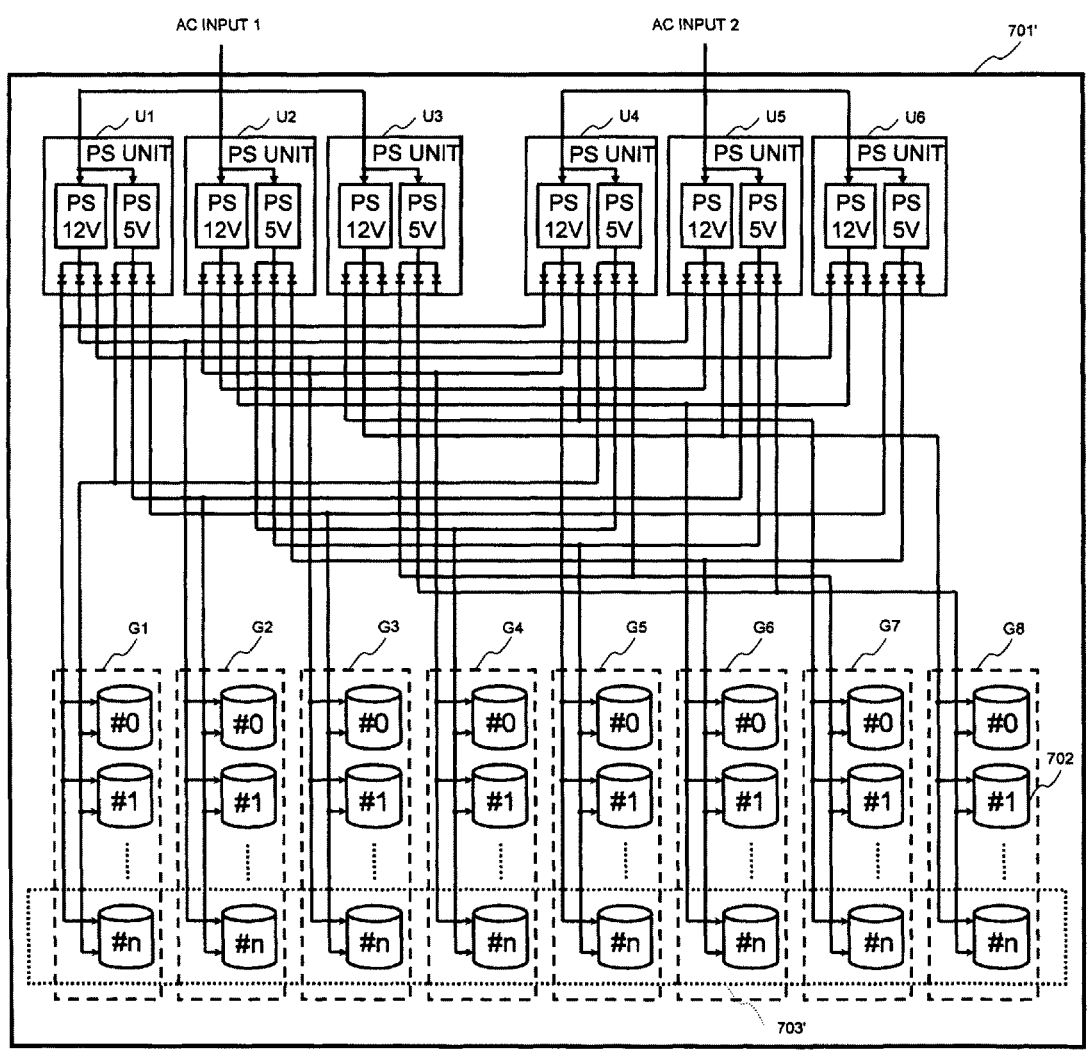
FIG. 17 shows a variation example of the configuration in the enclosure 701 in the first embodiment.

The first embodiment was described as above. Note that the number of power supply boundaries in a enclosure 701 is not limited to four but it can also be eight, for example, as shown in FIG. 17. In that case, a RAID group is configured of HDDs 702 included respectively in the power supply boundaries G1 to G8. That is, for example, instead of a RAID group 703 of 3D+1P, a RAID group 703' comprised of 7D+1P is configured. In addition, according to the description by referring to FIG. 9A, the total number of first power supplies and second power supplies is six. Therefore, as shown in FIG. 17, six power supply units U1 to U6 are installed in one enclosure 701', and first power supplies (a set of a 12-volt power supply and a 5-volt power supply) are installed in each of the power supply units U1 to U3 that receive power from the AC input 1, and second power supplies (a set of a 12-volt power supply and a 5-volt power supply) are installed in each of the power supply units U4 to U6 that receive power from AC input 2.

EXAMPLE 2

The second embodiment is described below. In the course of the description, the differences from the first embodiment are mainly stated, and the description of what is common to the first embodiment is omitted or stated only briefly.

Figure 18:
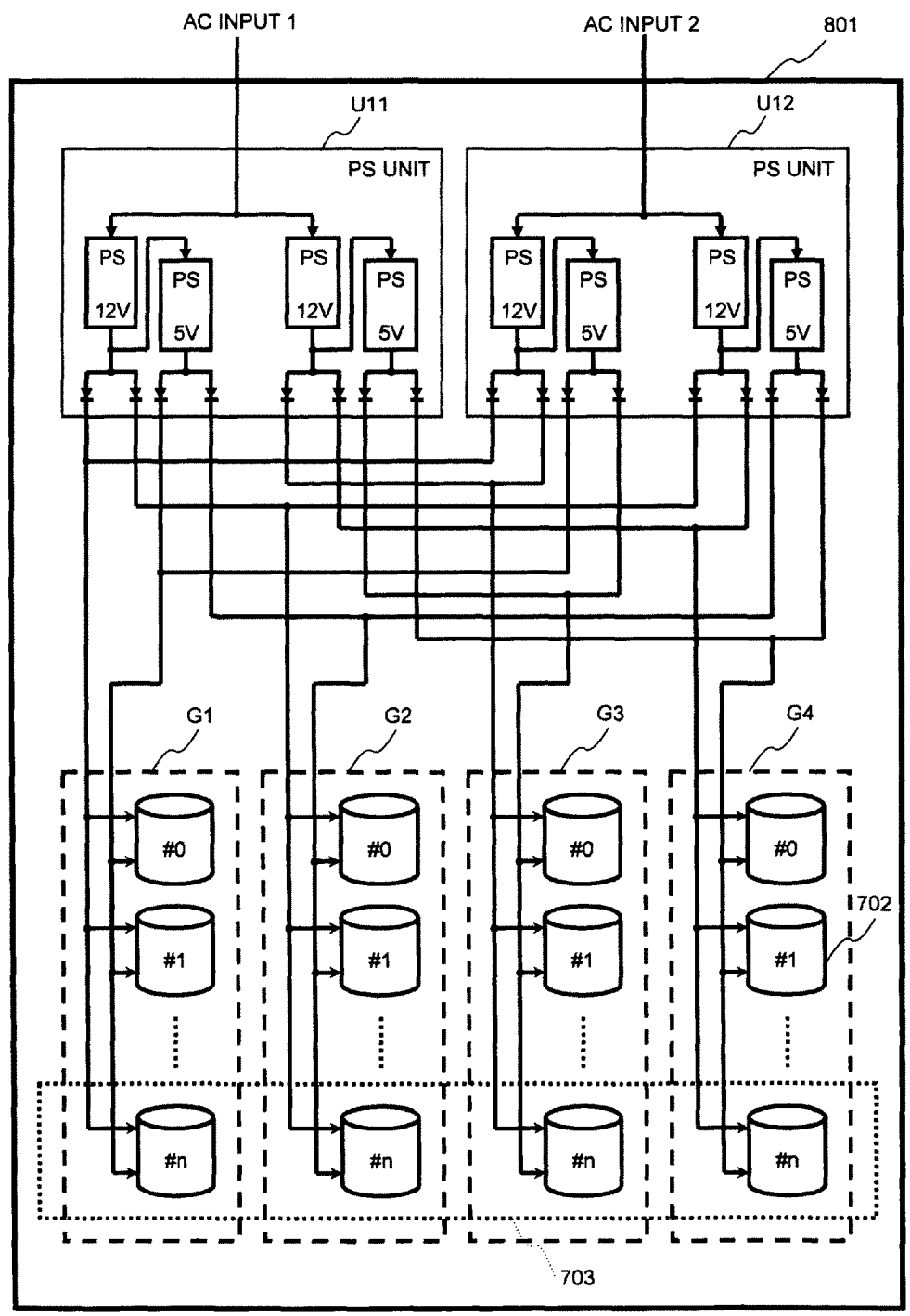
FIG. 18 shows the details of the configuration of a power feeding part in a enclosure 801 which the storage system related to the second embodiment of this invention has.

FIG. 18 shows the details of the configuration in the power feeding part of a enclosure 801 which the storage system related to the second embodiment of this invention has.

Instead of the power supply units U1 to U4 in the configuration shown in FIG. 16, power supply units U11 and U22 are adopted. That is, two 12-volt power supplies and two 5-volt power supplies are compiled into one power supply unit. This reduces the number of power supply units, and thus, the power feeding part can expectedly be configured inexpensively.

Furthermore, as for the power supply units U11 and U22, in each set (a set of 12-volt power supply and a 5-volt power supply), the 12-volt power supply, which is a high-voltage supply, is placed higher than the 5-volt power supply, which is a low-voltage supply. The 12-volt power supply is the AC/DC converter which converts AC voltage from the AC input 1 (or AC input 2) into 12-volt DC voltage. The 5-volt power supply is the DC/DC converter which steps down 12-volt DC voltage from the 12-volt power supply to 5-volt DC voltage. That DC/DC converter is, for example, a non-insulated DC/DC converter. Thus, the power feeding part can be expected to be configured even more inexpensively.

EXAMPLE 3

The third embodiment is described below. In the course of the description, the differences from the second embodiment are mainly stated, and the description of what is common to the second embodiment is omitted or stated only briefly.

Figure 19:
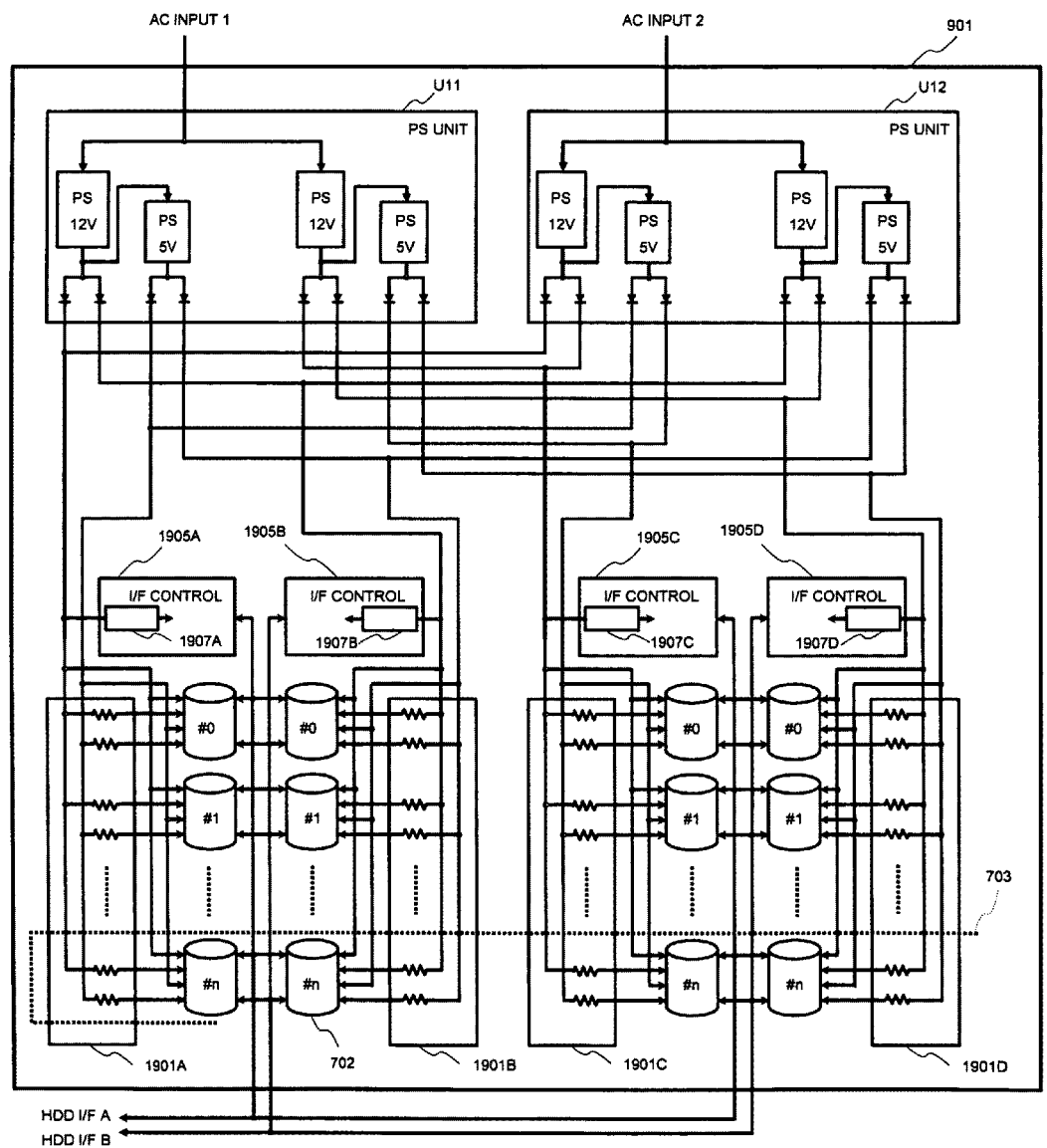
FIG. 19 shows the details of the configuration of a power feeding part in a enclosure 901 which the storage system related to the third embodiment of this invention has.

FIG. 19 shows the details of the configuration in the power feeding part of a enclosure 901 which the storage system related to the third embodiment of this invention has.

The power feeding targets (storage devices) from each of the power supply units U11 and U12 are I/F control circuits 1905A to 1905D besides HDDs. In each of the I/F control circuits 1905A to 1905D, an inrush current prevention circuit is installed for inhibiting voltage fluctuation in the power feeding path in hot swap of an HDD 702, etc.

In addition, in this embodiment, inrush current that flows into an HDD 702 in the hot swap of the HDD 702 can be limited by the inrush prevention circuits (such as resistance value) 1901A to 1901D. Therefore, when an HDD 702 is inserted, due to the sequence of the contact, the inrush current prevention circuit 1901A is supposed to be connected first.

EXAMPLE 4

The fourth embodiment is described below. In the course of the description, the differences from the first embodiment are mainly stated, and the description of what is common to the first embodiment is omitted or stated only briefly. Furthermore, in the following description, a direct current voltage of x volts is expressed as "DCxV". Further, in the following description, it is assumed that the first voltage required in the HDD is "DC12V", and that the second voltage required in the HDD is "DC5V".

<Outline of Fourth Embodiment>

Figure 20:
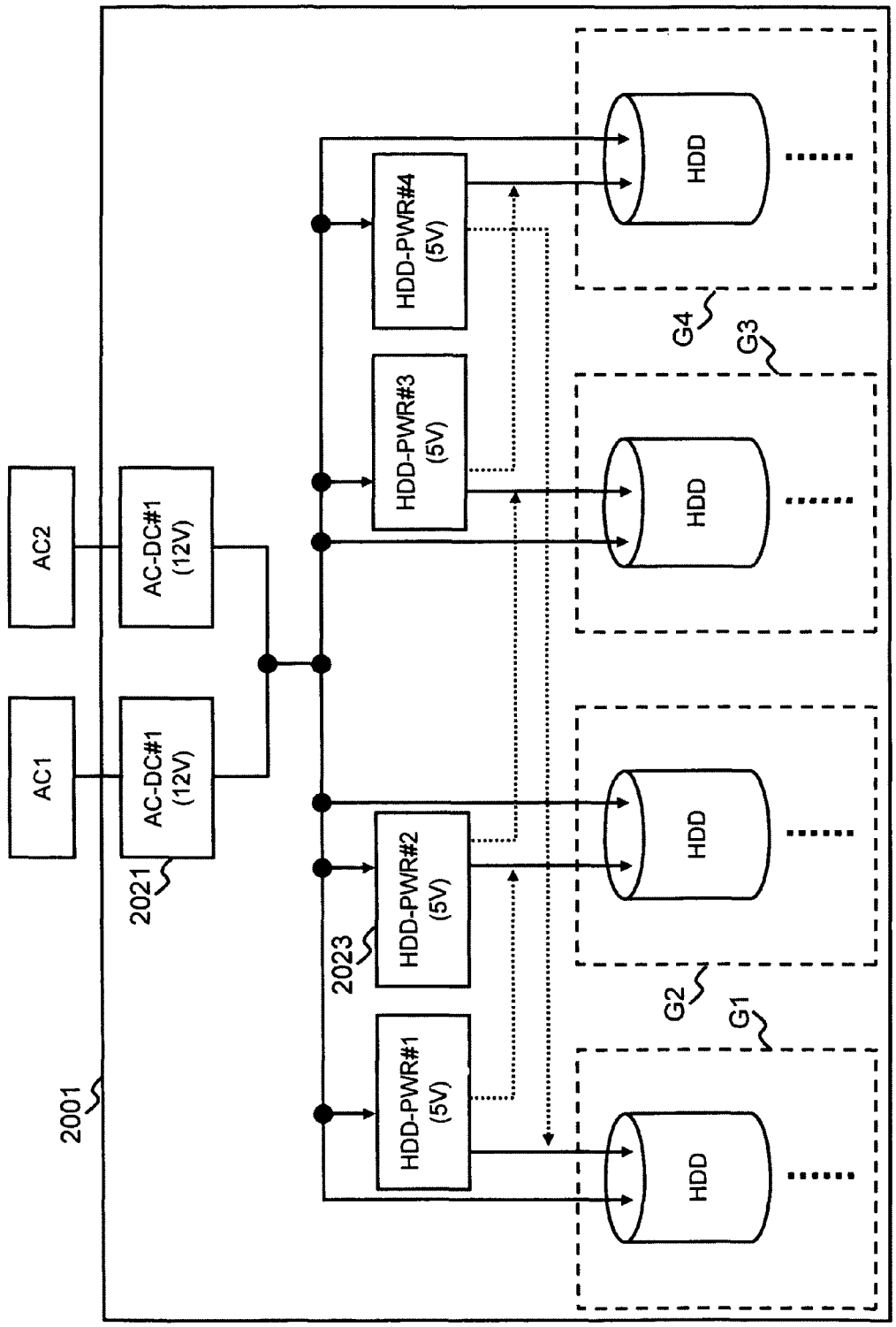
FIG. 20 shows a configuration of a power feeding part of a storage system 2001 related to a fourth embodiment of the present invention.

FIG. 20 shows a configuration of a power feeding part of a storage system 2001 related to the fourth embodiment.

The storage system 2001 comprises a first power supply unit 2021 and a second power supply unit 2023.

The first power supply unit 2021 is redundant. The first power supply unit 2021 is a power supply circuit comprising an AC-DC converter that converts AC voltage (for example, 200V) from a commercial power supply to DC12V. Hereinafter, the one first power supply unit 2021 is described as "AC-DC #1" and the other first power supply unit 2021 is described as "AC-DC #2". An alternating current voltage is input from a first commercial power supply AC1 to the AC-DC #1, and an alternating current voltage is input from a second commercial power supply AC2 to the AC-DC #2. Note that, the redundancy of the first power supply unit 2021 may be three or more.

The DC12V from the AC-DC #1 and #2 is supplied to the 12V system of the respective HDD 2031 and to the respective second power supply units 2023.

Whereas the AC-DC #1 and #2 are power supply units (12-volt system power supply circuits) that output DC12V, the second power supply unit 2023 is a power supply unit (5-volt system power supply circuit) that outputs DC5V. Specifically, the second power supply unit 2023 is a power supply circuit comprising a DC-DC converter that converts the DC12V from the AC-DC #1 and #2 to DC5V. The DC5V from the second power supply unit 2023 is supplied to the 5-volt system of the HDD 2023. For this reason, the second power supply unit is described as the "HDD-PWR" hereinbelow.

In this embodiment, it is possible to reduce the number of HDD-PWR 2023 to a number equal to or less than the number of power supply boundaries while maintaining the redundancy of the HDD-PWR 2023. According to the example of FIG. 20, the number of power supply boundaries is four (there are four power supply boundaries G1 through G4), and the number of HDD-PWR 2023 is four (HDD-PWR #1 through #4). In a case where power feeding is being carried out (solid arrow) to one power supply boundary from the HDD-PWR 2023 corresponding to this power supply boundary, and a failure occurs in this HDD-PWR 2023, this power supply boundary receives power feeding from another HDD-PWR 2023 (dotted arrow). Note that, the meanings of the solid arrow and the dotted arrow from the HDD-PWR 2023 are the same in FIGS. 26 and 28 below.

Figure 1:
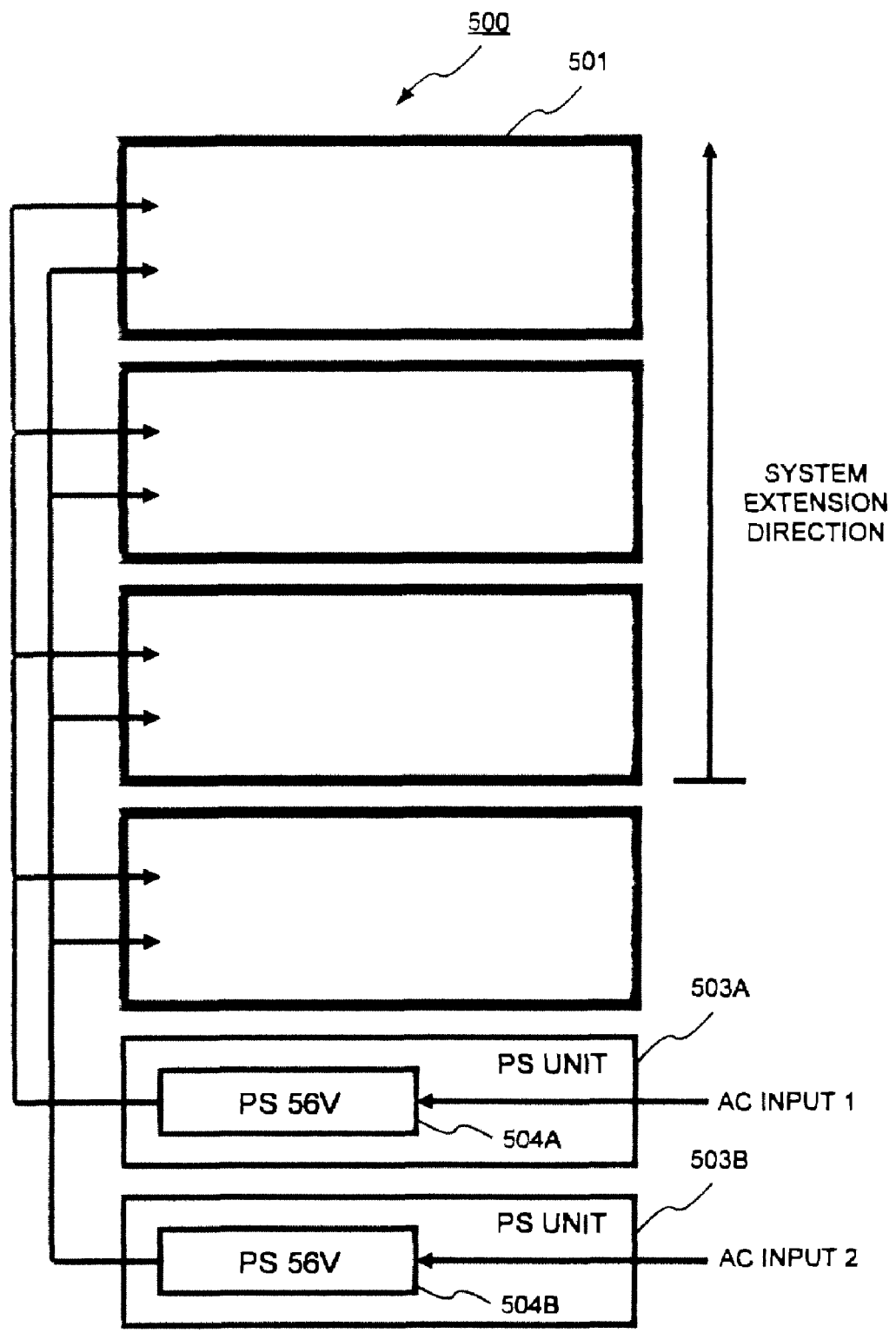
FIG. 1 shows the outline of a conventional storage system.
Figure 2:
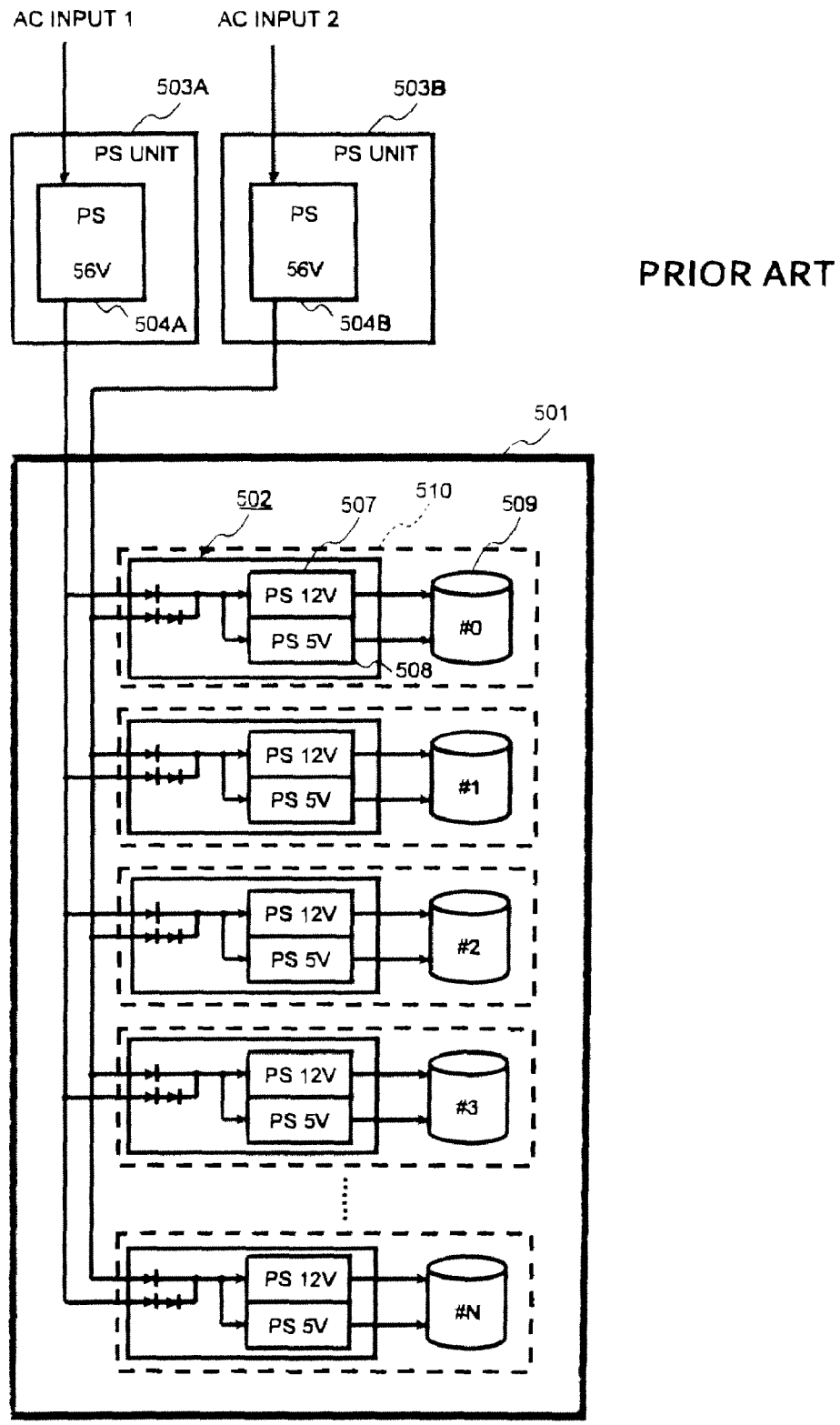
FIG. 2 shows the configuration of the power feeding system in a conventional storage system.

According to a first characteristic of this embodiment, the DC12V that the HDD needs is obtained from AC voltage from a commercial power supply. For this reason, this first characteristic is able to heighten power conversion efficiency more than the method described by referring to FIG. 2 (the method in which the AC voltage from the commercial power supply is converted to DC56V one time, and thereafter, this DC56V is converted to DC12V).

According to a second characteristic of this embodiment, the circuit board comprising the 5-volt power supply circuit (HDD-PWR) is isolated from the circuit board comprising the 12-volt power supply circuit (AD-DC), and the respective HDD-PWR are arranged in close proximity to the power supply boundary (the power supply boundary that constitutes the below-described main DC5V supply target), which is the power feeding target from this HDD-PWR. This enables a high-quality DC5V to be supplied to each HDD. Specifically, the respective HDD-PWR are arranged closer to this power supply boundary than the other HDD-PWR that supplies the sub DC5V to the power supply boundary to which the below-described main DC5V is supplied from this HDD-PWR (refer to FIGS. 21 and 22).

According to a third characteristic of this embodiment, the principle described in the first embodiment is applied to the HDD-PWR, and, in addition, the AC-DC is redundant. In accordance with this, the same as in the first embodiment, it is possible to configure the power supply boundary using fewer 12-volt power supply circuits and 5-volt power supply circuits than the system described by referring to FIG. 2.

According to a fourth characteristic of this embodiment, DC12V is created from an AC voltage from a commercial power supply, and DC5V is created from this DC12V. This achieves an effect that eliminates the need to design separate power supply circuits for the 3.5-inch HDD and the 2.5-inch HDD (integrates the power supply circuits). The integration of the power supply circuits is described below.

<Integration of Power Supply Circuits>

It is assumed that the HDD needs DC12V and DC5V, and that the power consumption will differ in accordance with the type of HDD. The HDD type may be a type that conforms from the standpoint of interface, such as FC, SATA, and SAS, and may be a type that conforms from the standpoint of size, like 3.5 inch and 2.5 inch. In this embodiment, there are two types of HDD 2031, a 3.5-inch HDD and a 2.5-inch HDD.

The storage system 2001 related to this embodiment can comprise both a enclosure mounted with a 3.5-inch HDD (3.5-inch enclosure hereinafter), and a enclosure mounted with a 2.5-inch HDD (2.5-inch enclosure hereinafter).

Figure 21:
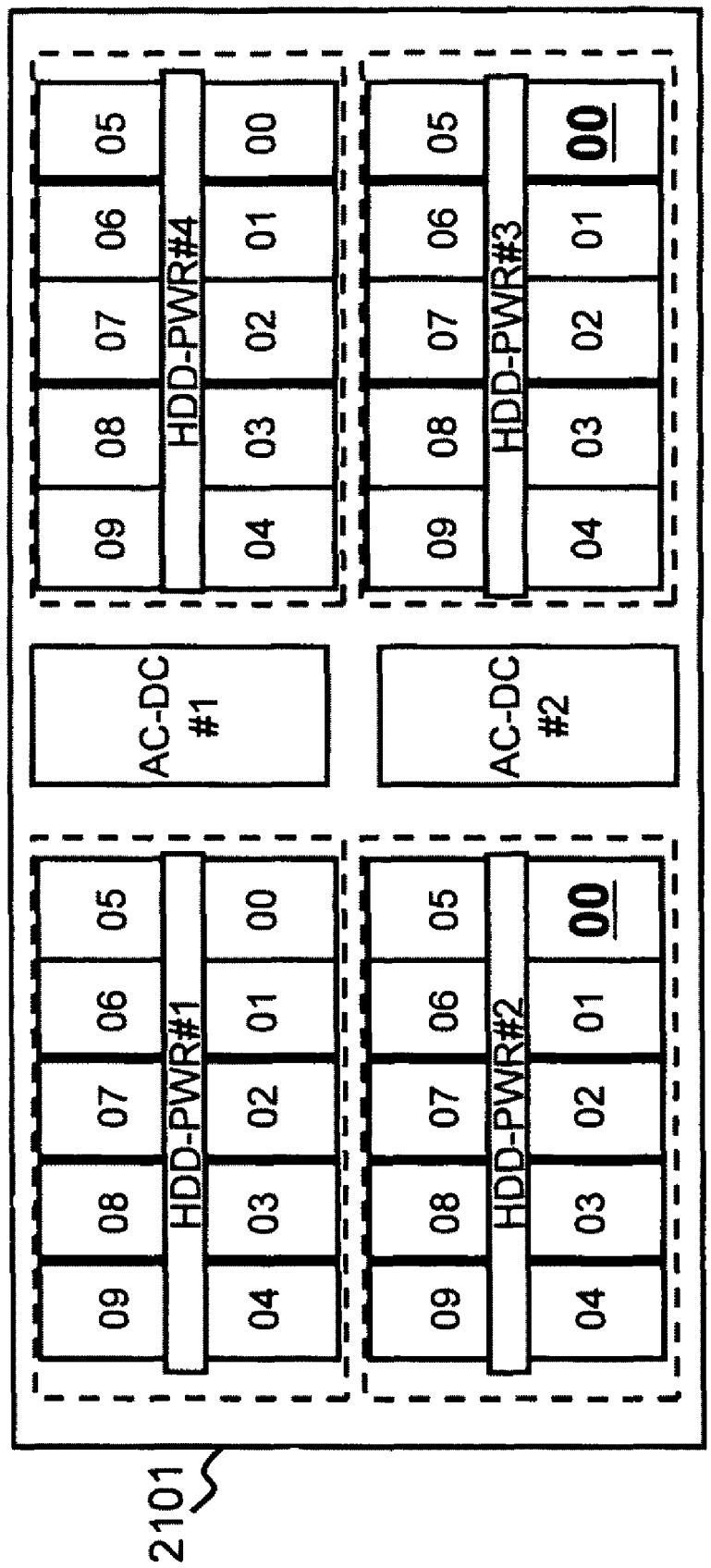
FIG. 21 is a front view of a 3.5-inch enclosure.
Figure 22:
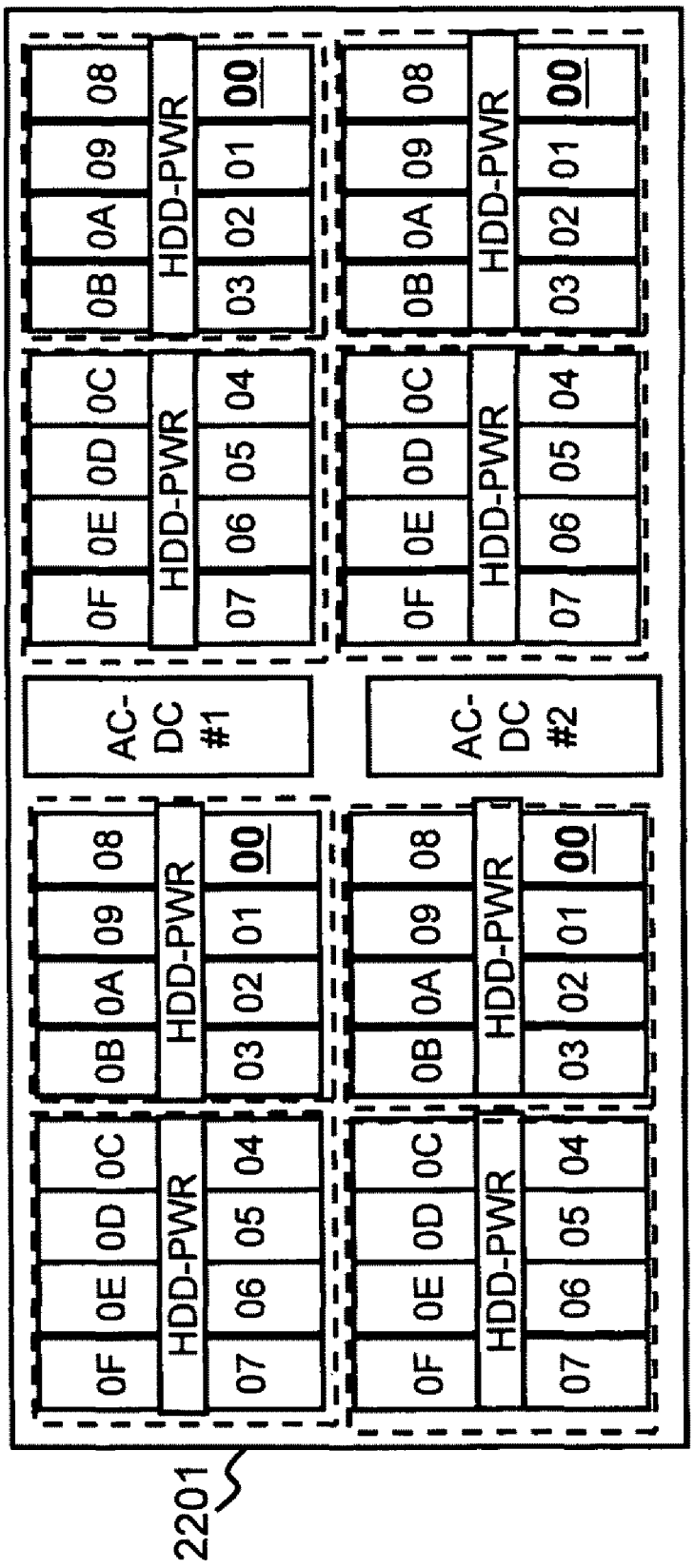
FIG. 22 is a front view of a 2.5-inch enclosure.

FIG. 21 is a front view of the 3.5-inch enclosure, and FIG. 22 is a front view of the 2.5-inch enclosure.

According to FIGS. 21 and 22, K HDD (where K is an integer of 2 or larger), which configure one power supply boundary, are densely arranged. For example, the K HDD are mounted in a matrix of p rows×q columns (=K) (where p and q are both natural numbers). Specifically, in the 3.5-inch enclosure 2101 (FIG. 21), one power supply boundary is configured from 2 rows×5 columns of HDD. In the 2.5-inch enclosure 2201 (FIG. 22), one power supply boundary is configured from 2 rows×4 columns of HDD. In both enclosure 2101 and 2201, the HDD-PWR are arranged in close proximity to the HDD in each power supply boundary (the above-mentioned second characteristic). This enables a high-quality DC5V to be supplied to all the HDD configuring a single power supply boundary. Note that, the above-described number of HDD configuring the power supply boundary is merely an example.

Further, according to FIGS. 21 and 22, HDD belonging to different power supply boundaries configure a single RAID group, as was also described in the first embodiment. For example, according to FIG. 21, a 3D+1P RAID group is configured from four HDD #00 (the 00 3.5-inch HDD) of four power supply boundaries, as indicated by bold characters and underlines. In addition, for example, according to FIG. 22, a 7D+1P RAID group is configured from eight HDD #00 (the 00 2.5-inch HDD) of eight power supply boundaries, as indicated by bold characters and underlines. Note that, the RAID group configurations shown in FIGS. 21 and 22 are merely examples. That is, for example, the 3.5-inch HDD may be a 7D+1P configuration, and the 2.5-inch HDD may be a 3D+1P configuration. The RAID group may be an arbitrary configuration no matter what type of HDD is used.

The enclosure 2101 and 2201 are the same size. Since the 2.5-inch HDD is smaller in size than the 3.5-inch HDD, the maximum number of 2.5-inch HDD is larger than the maximum number of 3.5-inch HDD. Specifically, for example, according to FIG. 21, a maximum of 40 3.5-inch HDD are able to be mounted in a single 3.5-inch enclosure, and according to FIG. 22, a maximum of 64 2.5-inch HDD are able to be mounted in a single 2.5-inch enclosure.

The power consumption in HDD units is as shown in the example given in FIG. 23A. That is, for the 12-volt system, the power consumption of the 2.5-inch HDD is more than 50 percent lower than the power consumption of the 3.5-inch HDD, and for the 5-volt system, the power consumption of the 3.5-inch HDD and the power consumption of the 2.5-inch HDD are the same. More specifically, the power ratio (the percentage of the 2.5-inch HDD power consumption with respect to the 3.5-inch HDD power consumption) related to the 12-volt system is 0.45, and the power ratio related to the 5-volt system is 1.

However, an AC-DC and a HDD-PWR do not supply power to just one HDD, but rather supply power to multiple HDD.

Accordingly, the power consumption in enclosure units is considered. According to the example of FIG. 23A, the power consumption in enclosure units is as shown in FIG. 23B. That is, the relationship of (A) through (C) below is obtained. It is believed that this relationship is maintained in a case where the size of the 3.5-inch enclosure and the size of the 2.5-inch enclosure are the same.

(A) Since the number of HDD mounted in a single enclosure is greater for the 2.5-inch enclosure, the power ratio related to the 5-volt system becomes larger than 1.

(B) However, the power related to the total power (the sum of the power consumption related to the 12-volt system and the power consumption related to the 5-volt system) is substantially the same in the 3.5-inch enclosure and the 2.5-inch enclosure.

(C) In addition, the power ratio related to the 12-volt system does not exceed 1.

Focusing on this relationship, in this embodiment, the 5-volt power supply circuit is isolated from the circuit board comprising the 12-volt power supply circuit, increases and decrease in accordance with the number of power supply boundaries, and, in addition, the DC5V is created from the DC 12V. For these reasons, both the 3.5-inch enclosure and the 2.5-inch enclosure are able to use the 12-volt power supply circuit, and the 5-volt power supply circuit is mounted in each of the power supply boundaries of both the 3.5-inch enclosure and the 2.5-inch enclosure. That is, it is not necessary to design separate power supply circuits for the 3.5-inch HDD and the 2.5-inch HDD.

The redundancy relationship of the HDD-PWR and the wiring of the AC-DC and the HDD-PWR are described for both the 3.5-inch enclosure and the 2.5-inch enclosure below.

<3.5-Inch Enclosure: HDD-PWR Redundancy Relationship and Wiring from AC-DC and HDD-PWR>

Figure 24:
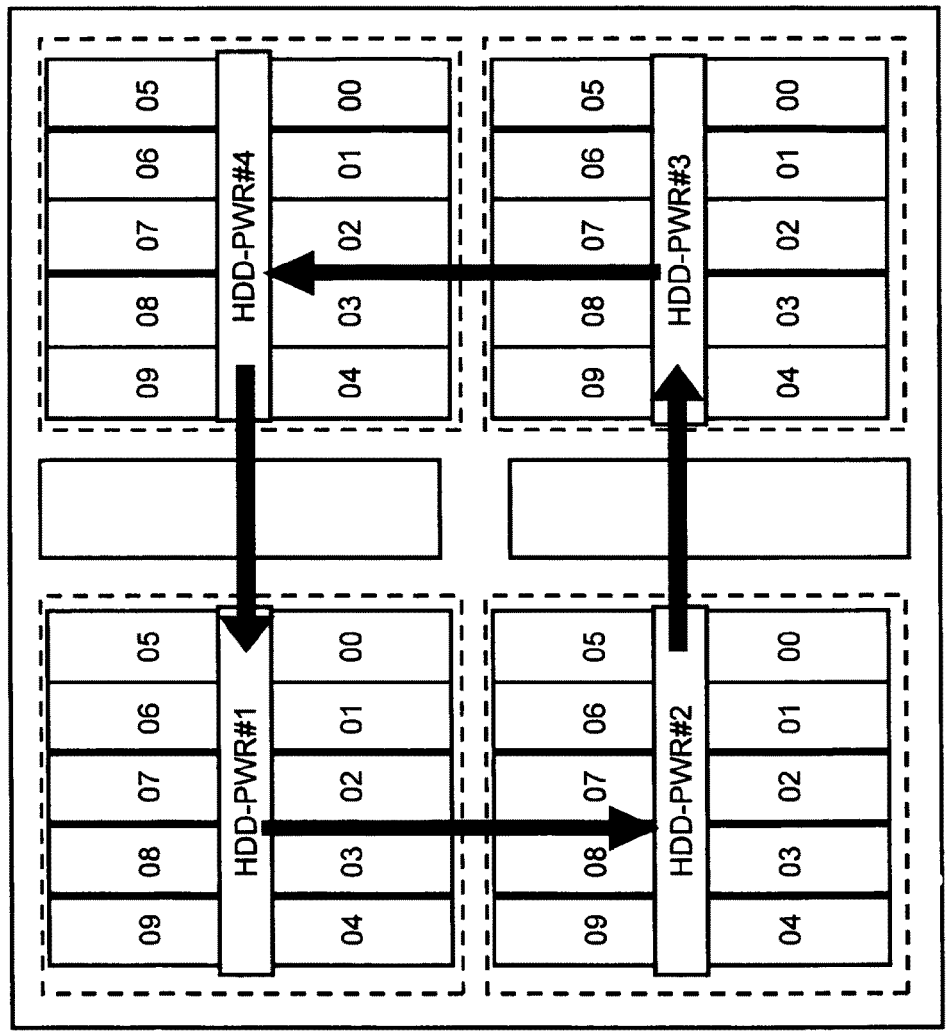
FIG. 24 shows the HDD-PWR redundancy relationship in the 3.5-inch enclosure.

It is assumed that 40 3.5-inch HDD (that is, a maximum number of 3.5-inch HDD) are mounted in one 3.5-inch enclosure. In accordance with this, as shown in FIG. 24, four power supply boundaries are constructed in one 3.5-inch enclosure (in FIGS. 24 through 29, the power supply boundary is indicated by a dotted line border). Each power supply boundary is configured from 10 HDD. Specifically, this is as follows.

Redundant AC-DC (AC-DC #1 and #2) are common to all the HDD.

A HDD-PWR is provided for each 10 HDD.

The HDD-PWR redundancy relationship is as shown using the thick arrows in FIG. 24. That is, for each HDD-PWR, when power feeding ceases to be performed from another HDD-PWR corresponding to another 10 HDD adjacent to the 10 HDD corresponding to this HDD-PWR, power feeding is carried out to this other 10 HDD.

According to the example of FIG. 24, the wiring from the AC-DC and the HDD-PWR for a single 3.5-inch enclosure is as shown in FIG. 20.

<2.5-Inch Enclosure: HDD-PWR Redundancy Relationship and Wiring from AC-DC and HDD-PWR>

Figure 25:
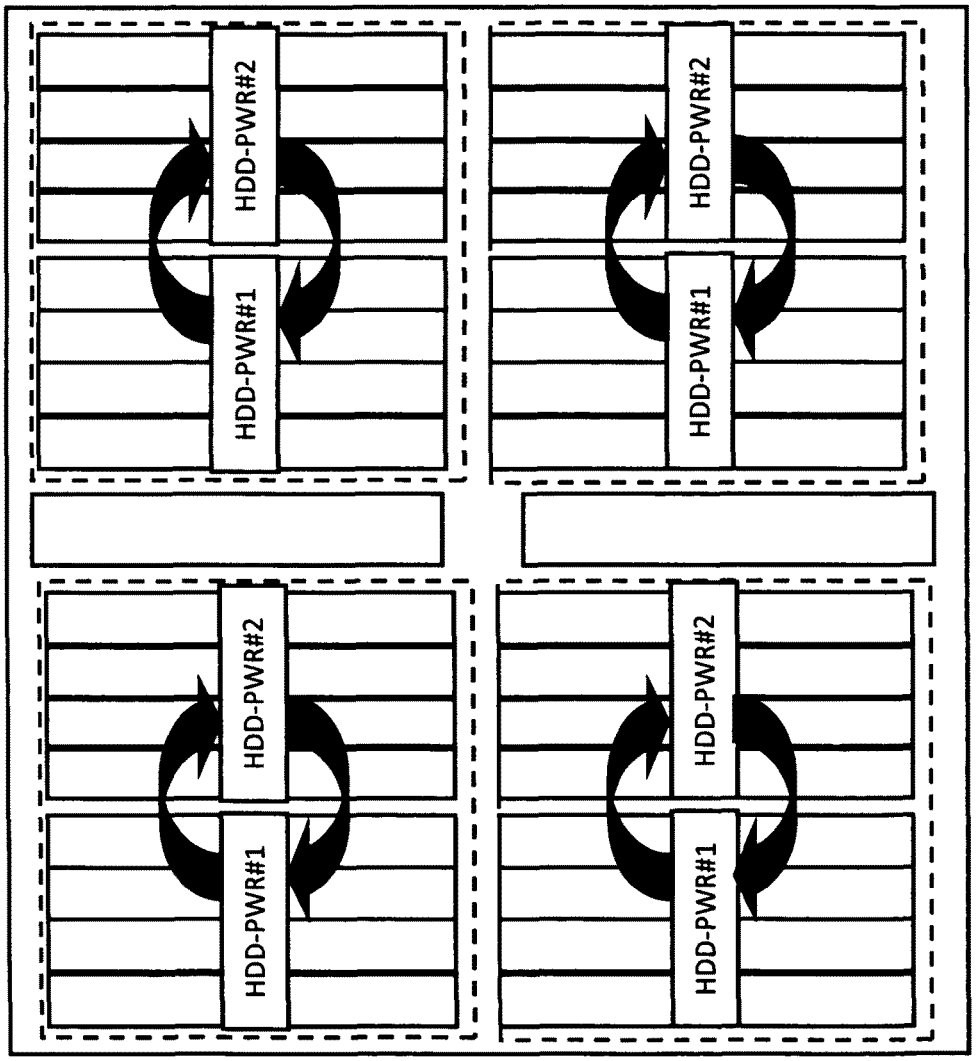
FIG. 25 shows the HDD-PWR redundancy relationship in the 2.5-inch enclosure.

It is assumed that 64 2.5-inch HDD (that is, a maximum number of 2.5-inch HDD) are mounted in one 2.5-inch enclosure. In accordance with this, as shown in FIG. 25, eight power supply boundaries G1 through G8 are constructed in one 2.5-inch enclosure. Each power supply boundary is configured from 8 HDD. Specifically, this is as follows.

Redundant AC-DC (AC-DC #1 and #2) are common to all the HDD.

A HDD-PWR is provided for each 8 HDD.

The HDD-PWR redundancy relationship is as shown using the thick arrows in FIG. 25. That is, for each HDD-PWR, when power feeding ceases to be performed from another HDD-PWR corresponding to another 8 HDD adjacent to the 8 HDD corresponding to this HDD-PWR, power feeding is carried out to this other 8 HDD. That is, a power supply boundary set corresponding to the HDD-PWR comprising the redundancy relationship is configured from two power supply boundaries, and there are four power supply boundary sets like this.

Figure 26:
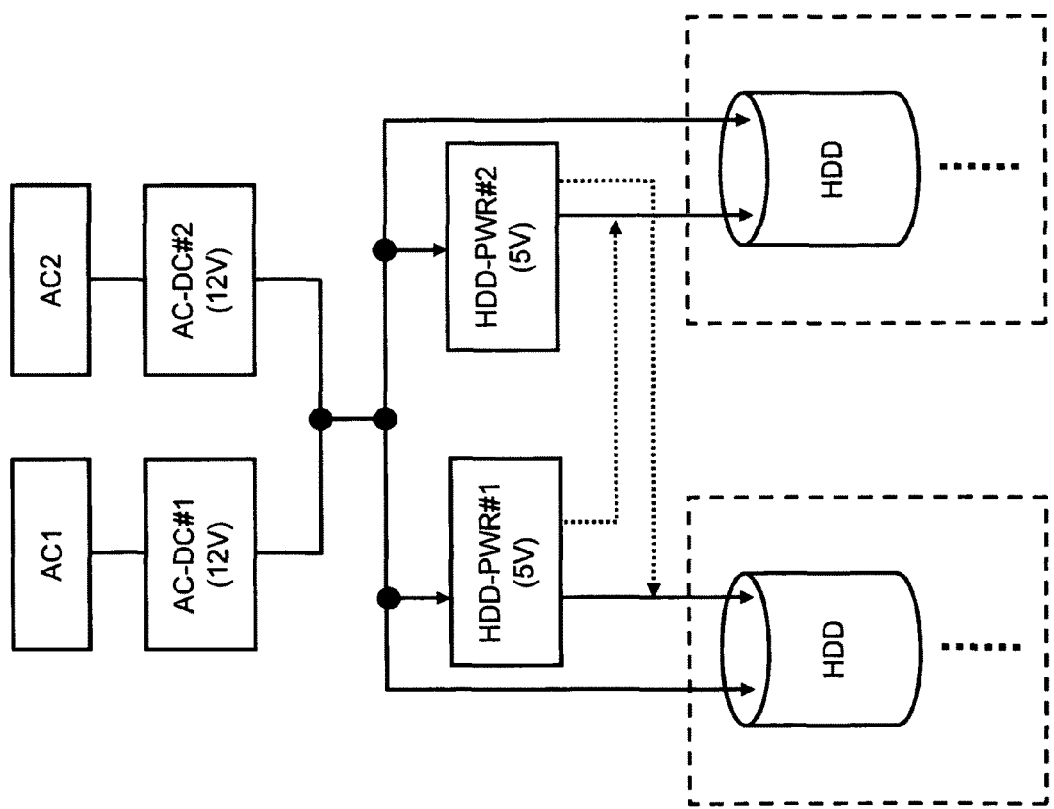
FIG. 26 shows wiring from AC-DC and HDD-PWR in the enclosure shown in FIG. 25.

According to the example of FIG. 25, the wiring from the AC-DC and the HDD-PWR for one power supply boundary set is as shown in FIG. 26.

<HDD Augmentation and Change of HDD-PWR Redundancy Relationship>

For example, it is assumed that the 2.5-inch enclosure is configured to be able to mount more than eight sets of eight 2.5-inch HDD. That is, it is assumed that the 2.5-inch enclosure is configured to be able to mount more than 64 2.5-inch HDD.

The augmentation (and reduction) of HDD may be carried out in predetermined units (for example, HDD may be added or removed one unit at a time). In this embodiment, augmentation (and reduction) is carried out in RAID group units. This is because a logical volume is constructed on the basis of the RAID group.

Figure 27:
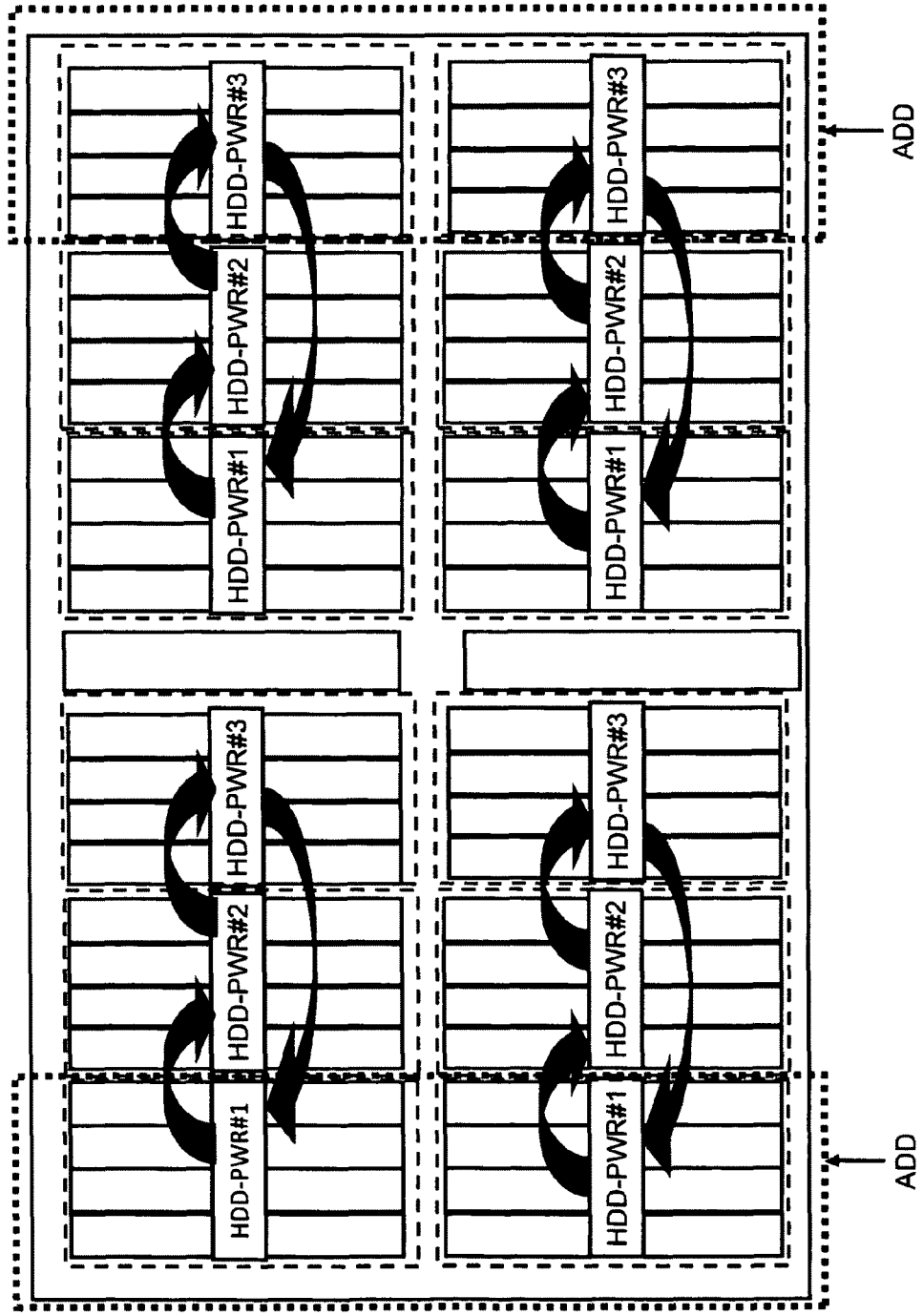
FIG. 27 shows that the number of power supply boundaries becomes an odd number in accordance with the addition of a RAID group in the enclosure shown in FIG. 25.

For example, in a case where the RAID group is configured from four HDD, a different power supply boundary must exist for each of these four HDD. For this reason, when augmentation is to be carried out in RAID group units based on the state shown in FIG. 25, at the least four power supply boundaries will be added. FIG. 27 shows an example of this. According to FIG. 27, eight RAID groups configuring four HDD are added, and four power supply boundaries configured from eight HDD are added.

The HDD-PWR redundancy relationship in this case is shown FIG. 27 using thick arrows. That is, a power supply boundary set corresponding to the HDD-PWR of the redundancy relationship is configured from three power supply boundaries lined up in the direction of the row of HDD (one power supply boundary is configured from eight HDD), and there are four power supply boundary sets like this. As a rule, each HDD-PWR covers the power supply boundary corresponding to this HDD-PWR and the power supply boundary adjacent to this power supply boundary in the HDD row direction. However, the HDD-PWR #3, which corresponds to the power supply boundary at the one end of the three power supply boundaries, does not cover the power supply boundary of this one end, but rather covers the power supply boundary at the other end of the three power supply boundaries separated by one power supply boundary.

Figure 28:
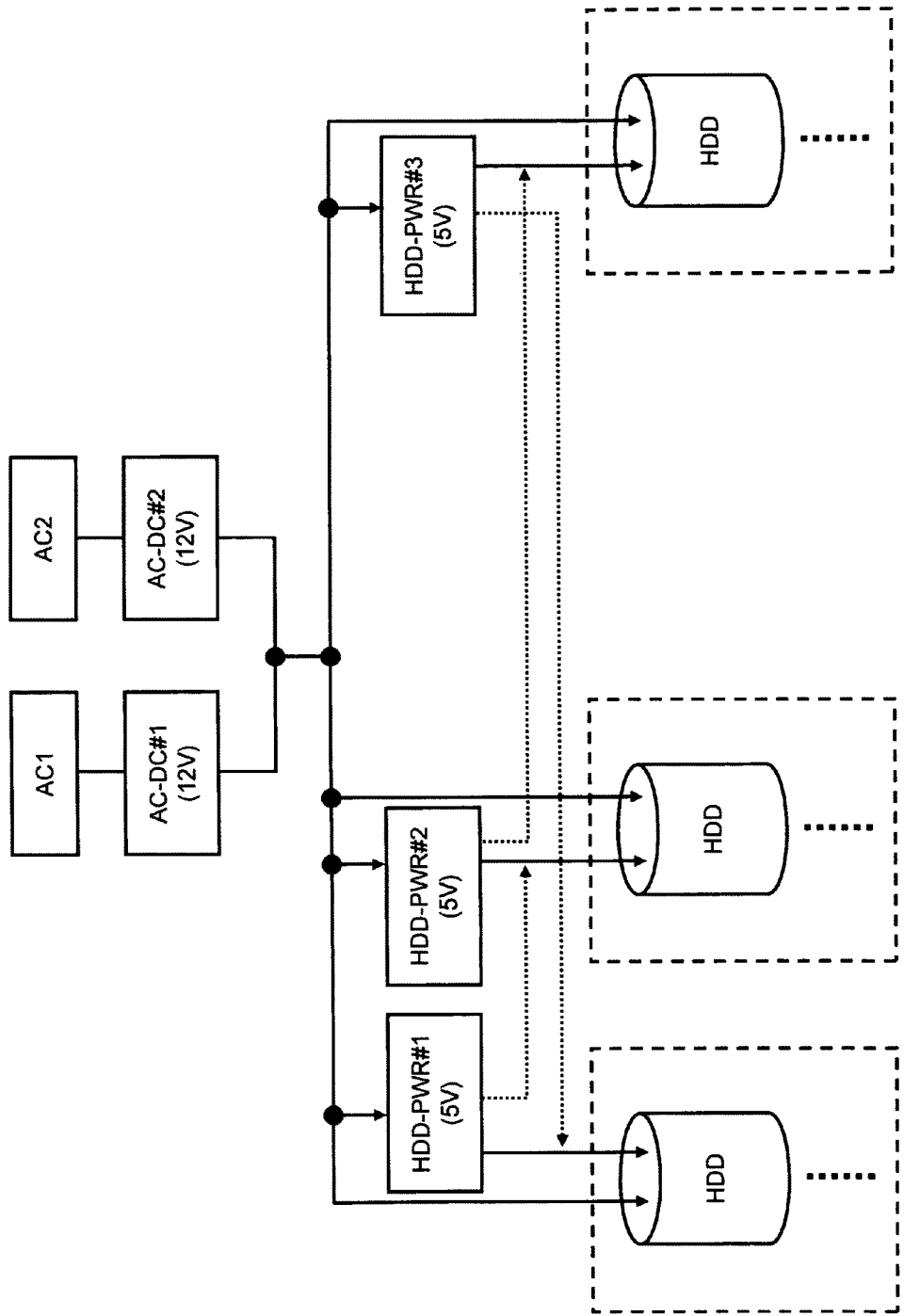
FIG. 28 shows wiring from AC-DC and HDD-PWR in the enclosure shown in FIG. 27.

According to the example of FIG. 27, the wiring from the AC-DC and the HDD-PWR for one power supply boundary set is as shown in FIG. 28.

Figure 29:
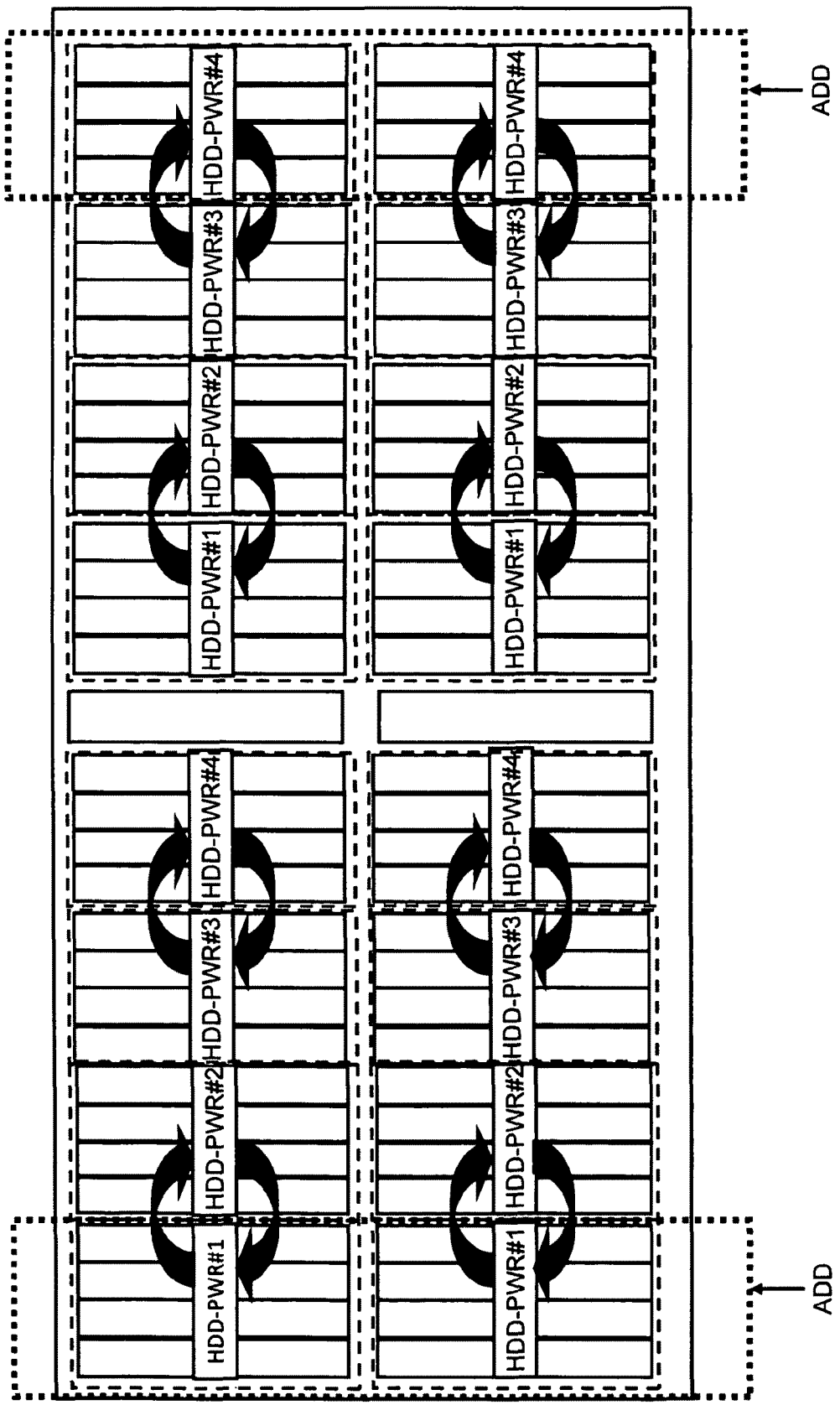
FIG. 29 shows that the number of power supply boundaries becomes an even number in accordance with the addition of a RAID group in the enclosure shown in FIG. 27.

Now then, based on the state shown in FIG. 27, it is also assumed that eight RAID groups are added, and consequently, eight power supply boundaries are added as shown in FIG. 29. In accordance with this, the HDD-PWR redundancy relationship is regarded as being as shown by the thick arrows in FIG. 29, and as such, the wiring from the AC-DC and HDD-PWR for one power supply boundary set is regarded as being as shown in FIG. 26 rather than as shown in FIG. 20. The reason for this is as follows.

When it is assumed that this wiring is as shown in FIG. 20, the number of power supply boundaries configuring one power supply boundary set is four, and the HDD-PWR, which corresponds to the power supply boundary at the one end of the four power supply boundaries, must cover the power supply boundary at the other end of the four power supply boundaries separated by two power supply boundaries. However, in so doing, the power supply line from the HDD-PWR corresponding to the power supply boundary of the one end to the respective HDD configuring the power supply boundary at the other end becomes long, thereby making it impossible to supply high-quality DC5V.

An example of a case in which HDD are added to the 2.5-inch enclosure has been described above, and in a case where HDD are removed from the 2.5-inch enclosure, the flow of operations is carried out in reverse of the flow of operations described by referring to FIGS. 27 through 29. In addition, the augmentation and reduction of HDD in the 3.5-inch enclosure is the same as that described for the augmentation and reduction of HDD in the 2.5-inch enclosure.

Based on the above, in this embodiment, in a case where the number of power supply boundaries is an odd number equal to or larger than 3, at the least one HDD-PWR covers the power supply boundary that is in a location that is separated by at the least one power supply boundary from the power supply boundary corresponding to this HDD-PWR. Alternatively, in a case where the number of power supply boundaries is an even number equal to or larger than 2, each HDD-PWR covers the power supply boundary adjacent to the power supply boundary corresponding to this HDD-PWR. That is, in the case of an even number of power supply boundaries, there is no need to feed DC5V to a power supply boundary that is separated by at the least one power supply boundary.

<HDD-PWR Configuration>

Figure 30:
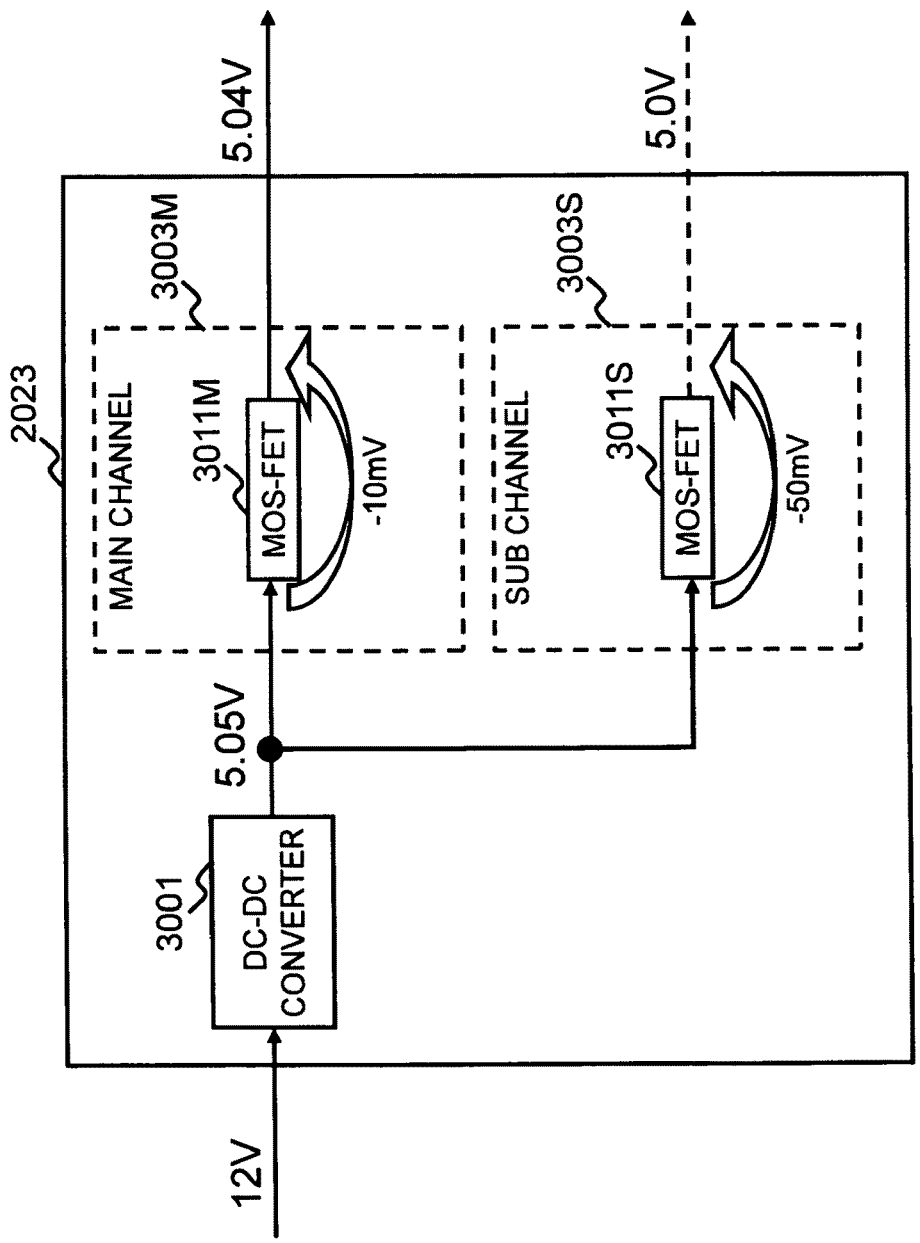
FIG. 30 shows a configuration of a HDD-PWR 2023.

FIG. 30 shows a configuration of the HDD-PWR 2023.

The HDD-PWR 2023, as described above, is a power supply circuit comprising a DC-DC converter 3001 that converts DC12V to DC5V (strictly speaking, DC5.05V), and comprises two channels as a 5-volt system output. Specifically, in addition to the DC-DC converter 3001, the HDD-PWR 2023 comprises a main channel circuit 3003M and a sub channel circuit 3003S. That is, both circuits 3003M and 3003S are backflow prevention circuits, and, in addition, the weight (output voltage) of the main channel is higher than that of the sub channel.

Neither of the circuits 3003M and 3003S here is an ordinary diode-based backflow prevention circuit, but rather is a backflow prevention circuit in accordance with either MOS-FET (Metal Oxide Semiconductor Field Effect Transistor) 3003M or 3003S.

In an ordinary diode-based backflow prevention circuit, the diode Vf (forward voltage drop) is somewhere between 0.3V and 0.4V, and the diode itself gives off a lot of heat. For example, in a case where the electric current is 30 A (amperes), the power becomes 9 W (W=I×V=30×0.3) at Vf=0.3V, and measures are needed to counter the heat generation. Possible countermeasures include attaching a heart sink or other such heat radiation part, and connecting multiple diodes in series, however, any of the countermeasures can not help causing cost up.

In addition, the Vf of respective diodes will fluctuate slightly depending on the diode, and it is impossible to arbitrarily decide the Vf.

In contrast to this, according to the HDD-PWR 2023 related to this embodiment, the respective channel circuits 3003M and 3003S are MOS-FET backflow prevention circuits. As an example, power consumption is a low 1.8 W (W=I²×R=30×30×0.02=1.8) when the electric current is 30 A and the MOS-FET ON resistance is 2 milliohms.

Further, it is possible to adjust the drop voltage (weight) of the main channel and the sub channel by adjusting the voltage supplied to the MOS-FET gate. Therefore adjusting the weight is easy. In this embodiment, the main channel circuit 3003M outputs DC5.04V, i.e., steps down the DC5.05V from the converter 3001 by 10 mV (millivolts), and the sub channel circuit 3003S outputs DC5.0V, i.e., steps down the DC5.05V from the converter 3001 by 50 mV. Switching such as that below is carried out in accordance with this configuration.

Figure 31:
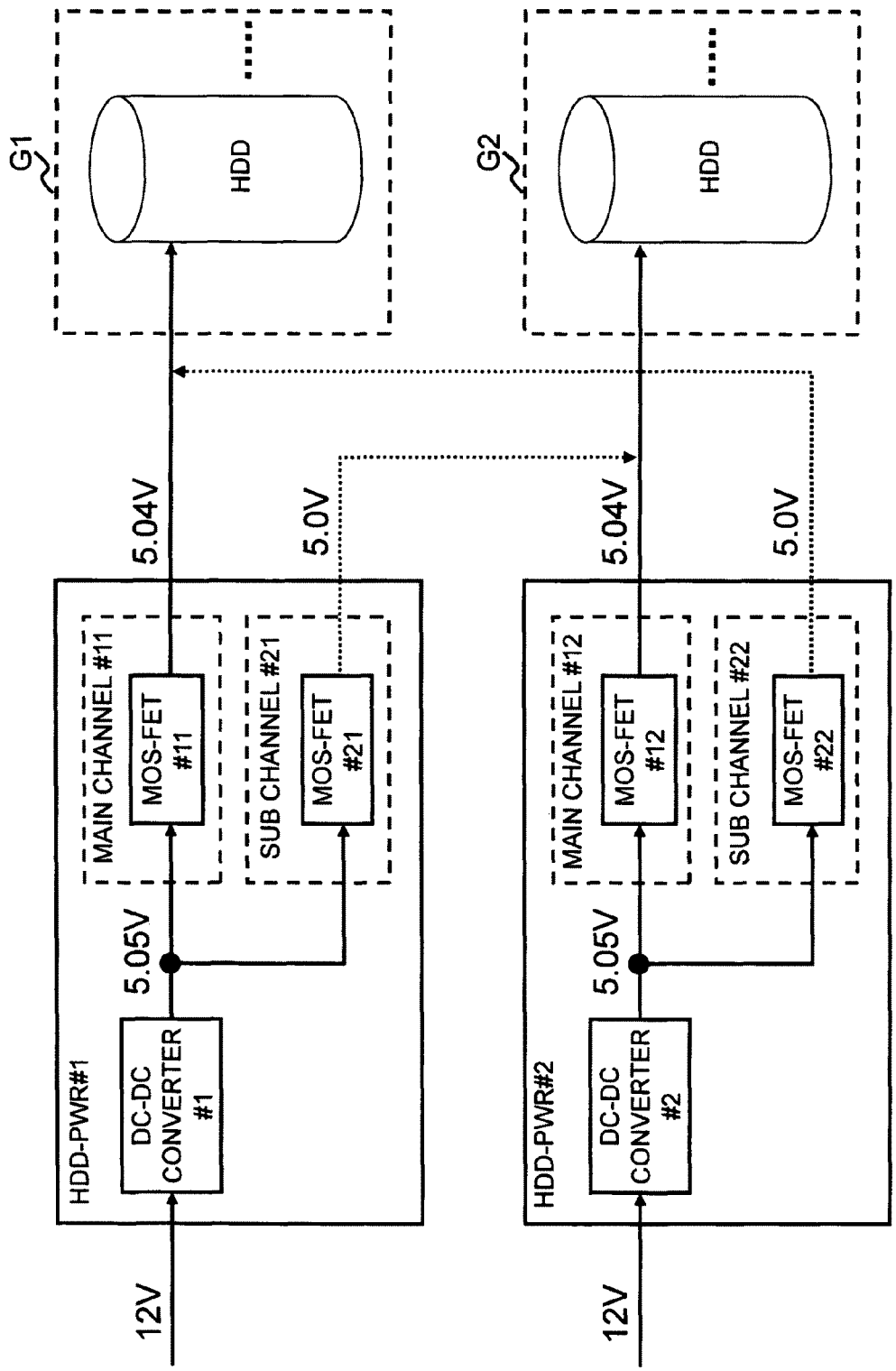
FIG. 31 shows power feeding when the HDD-PWR is redundant, i.e., the two HDD-PWR #1 and #2.

For example, as shown in FIG. 31, it is assumed that the HDD-PWR is made redundant using the two HDD-PWR #1 and #2, that HDD-PWR #1 corresponds to the power supply boundary G1, and that HDD-PWR #2 corresponds to the power supply boundary G2. In accordance with this, DC5.04V is supplied to the power supply boundary G1 from the main channel circuit #11 of the HDD-PWR #1, and DC5.04V is supplied to the power supply boundary G2 from the main channel circuit #21 of the HDD-PWR #2.

Figure 32:
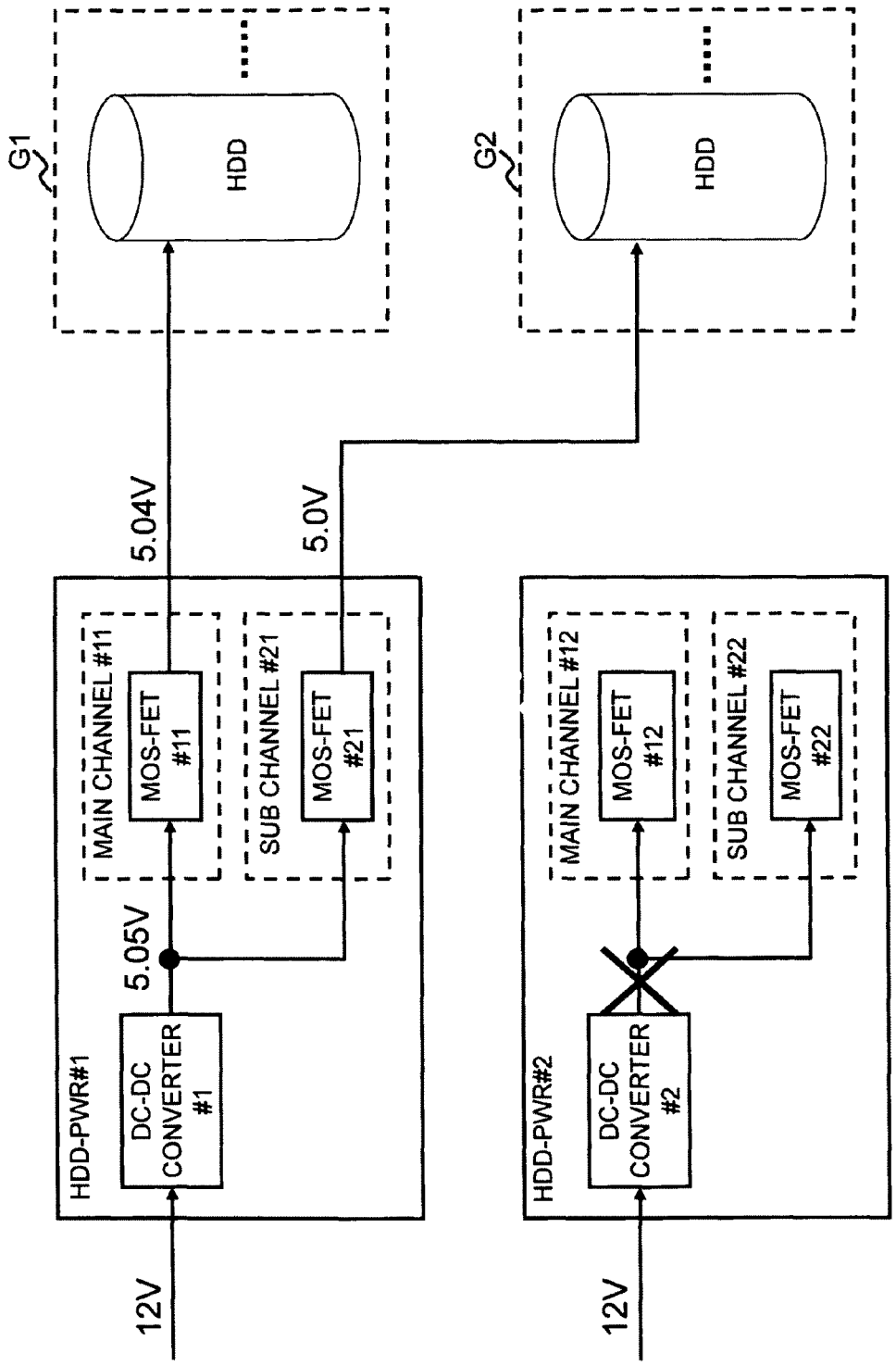
FIG. 32 shows power feeding when a failure occurs in HDD-PWR #2.

As shown in FIG. 32, when a failure occurs in the HDD-PWR #2 here, DC5.0V is supplied to the power supply boundary G2 from the sub channel circuit #21 of the HDD-PWR #1 instead of the DC5.04V from the HDD-PWR #2.

<Configurations of Main Channel Circuit and Sub Channel Circuit>

A backflow prevention circuit of the same configuration can be used in both the main channel circuit 3003M and the sub channel circuit 3003S for any HDD-PWR. That is, the configuration of the circuits 3003M and 3003S can be made the same. The configuration of a channel circuit will be described below by taking the sub channel circuit 3003S as an example.

Figure 33:
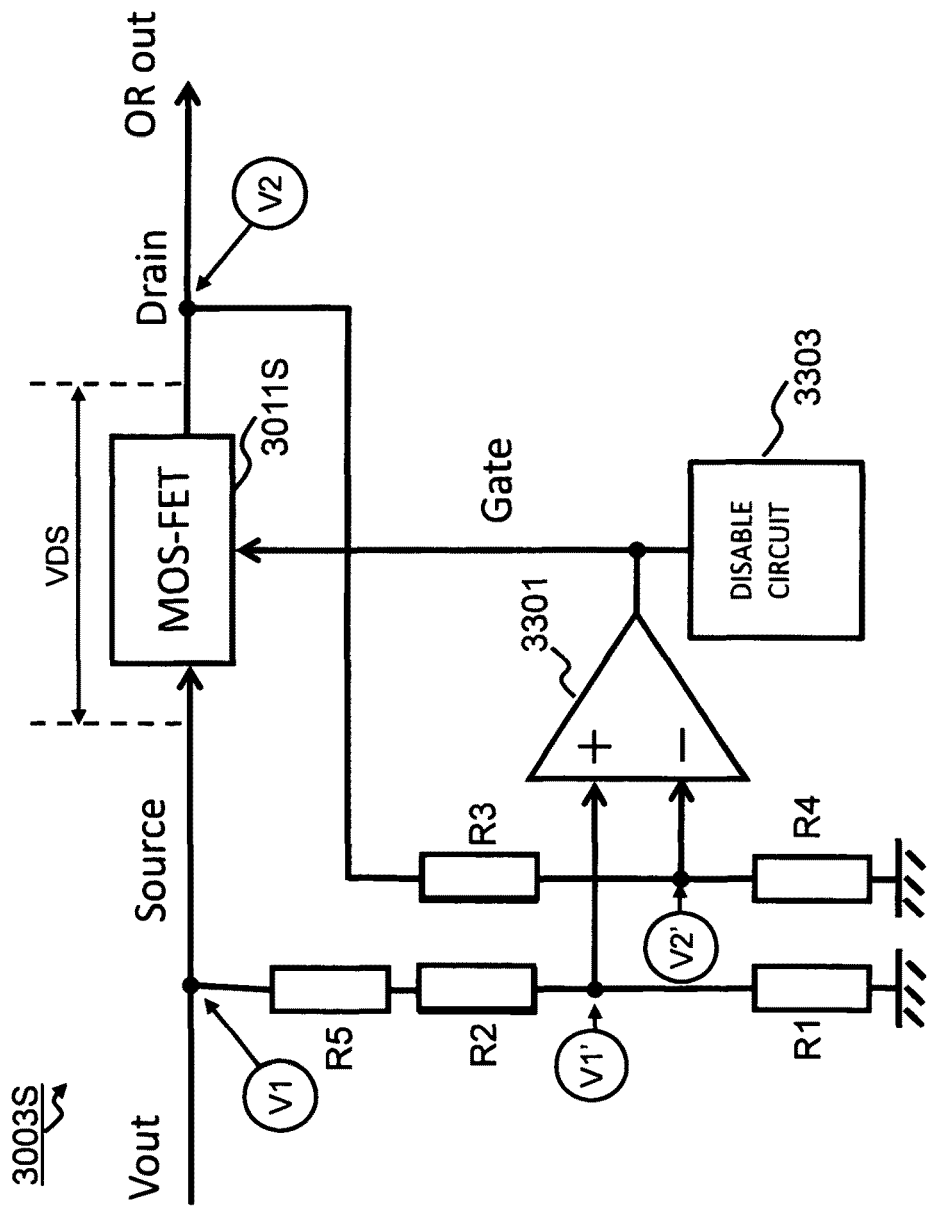
FIG. 33 shows a configuration of a sub-channel circuit 3003S.

FIG. 33 shows the configuration of the sub channel circuit 3003S.

The circuit 3003S comprises an operational amplifier 3301, a disable circuit 3303, and a weight setting resistor R5 in addition to the MOS-FET 3011S.

The MOS-FET 3011S source is connected to the DC-DC converter 3001. The MOS-FET 3011S drain is connected to the power supply boundary side (specifically, for example, to the backboard to which the respective HDD configuring the power supply boundary are connected).

A signal representing voltage V1', which is based on the voltage (the source voltage) V1 applied to the source side of the MOS-FET 3011S, is input to a first input terminal of the operational amplifier. A signal representing voltage V2', which is based on the voltage (the drain voltage) V2 applied to the drain side of the MOS-FET 3011S, is input to a second input terminal of the operational amplifier. An output terminal of the operational amplifier 3301 is connected to the MOS-FET 3011S gate. The gate of the MOS-FET 3011S is shut off by the disable circuit 3303 until the operational amplifier 3301 boots up.

According to the above description, it is desirable that the drain-source voltage VDS of the MOS-FET 3011S be larger than 0V (that a difference be generated between the drain voltage V2 and the source voltage V1), and, in addition, that the VDS becomes constant. According to the example described above, it is desirable that VDS=50 mV in this sub channel circuit 3003S (it is desirable that VDS=10 mV in the main channel circuit 3001S). However, control will act to cause an imaginary short (a virtual short) between the operational amplifier 3301 input terminals. That is, control will act to make V1'=V2' even when the source voltage V1 is higher than the drain voltage V2. Accordingly, a weight setting member is provided in order to generate a difference between the voltage V1' and the voltage V2'. In this embodiment, a resistor R5 is used as the weight setting member. Specifically, if there is not the resistor R5, the voltage-dividing ratio of the operational amplifier 3011 is even in due to resistors R1, R2, R3 and R4 (for example, the values of resistors R1, R2, R3 and R4 are the same). However, the resistor R5 is set to the circuit 3003S, therefore, the voltage-dividing ratio of the operational amplifier 3011 changes, a difference between V1' and V2' is made, and the drain-source voltage VDS occurs. The value of the resistor R5 is a value that makes it possible to achieve the desired VDS (the value corresponding to the size of the VDS (drop voltage)).

According to the above configuration, in a case where the source voltage V1 is higher than the drain voltage V2, the operational amplifier 3301 adjusts the gate voltage so that the VDS becomes constant. Since a 50 mV drop is performed in this circuit 3003S, the VDS is 50 mV. Alternatively, the VDS is 10 Mv in the main channel circuit 3003M. Thus, in this embodiment, the configurations of the channel circuits 3003S and 3003M are the same, but the size of the voltage outputted by each of the circuits 3003S and 3003M will differ in accordance with different size resistors that serve as the weight setting members.

Note that, in a case where the drain voltage V2 is higher than the source voltage V1, the relationship between the voltage V1' and the voltage V2' breaks down, and the operational amplifier 3301 turns OFF the MOS-FET 3011S. That is, in this circuit 3003S, the VDS is monitored by the operational amplifier 3301, and feedback is performed so that the VDS becomes constant. When a high voltage is applied to the drain side (the backboard side), the MOF-FET 3011S instantly transitions to the OFF state. This prevents backflow.

The resistance (ohm) when the MOS-FET is in the ON state is low. For example, in a case where the ON resistance of the MOS-FET is 2 milliohms and the electric current is 30 A, the power consumption of the MOS-FET 3011S is around 1.8 W ($W=I^2 \times R = 30 \times 30 \times 0.02 = 1.8$). That is, it is possible to perform backflow prevention with low loss. Note that, hypothetically, in a case where backflow prevention is realized using a Schottky barrier diode, power consumption reaches 9 W ($30 \times 0.3=9$) when the diode is set to Vf=0.3 and the electric current is 30 A, and as such, operation is impossible without a heat sink and power feeding loss will probably also be high.

According to the above-described HDD-PWR 2023, multiple channel circuits (backflow prevention circuits) are provided in the latter stage (downstream side) of the DC-DC converter 3001 that converts DC12V to DC5.05V, and each channel circuit comprises a MOS-FET. Furthermore, it is possible to change the weight of a channel circuit (the value of the drop voltage) by changing the drain-source voltage VDS of the MOS-FET in the multiple channel circuits. That is, it is possible to create a main channel circuit 3003M, which supplies a main voltage, and a sub channel circuit 3003S, which supplies a sub-voltage that is a lower voltage than the main voltage. The main voltage) is supplied to the power supply boundary corresponding to the HDD-PWR 2023. The sub-voltage does not pass through this main voltage power supply line while the main voltage is being supplied from another HDD-PWR corresponding to another power supply boundary, but when the main voltage ceases to be supplied from this other HDD-PWR, the sub-voltage is supplied to this other power supply boundary via this power supply line.

The HDD-PWR 2023 also comprises a backflow prevention function in addition to the functions that create the main voltage and the sub-voltage. Specifically, in a case where backboard over-voltage occurs, the MOS-FET is set to the OFF state, and none of the other power supply boundaries are affected.

<Integration of Controller Power Supply Circuit and HDD 12-Volt Power Supply Circuit>

Figure 34:
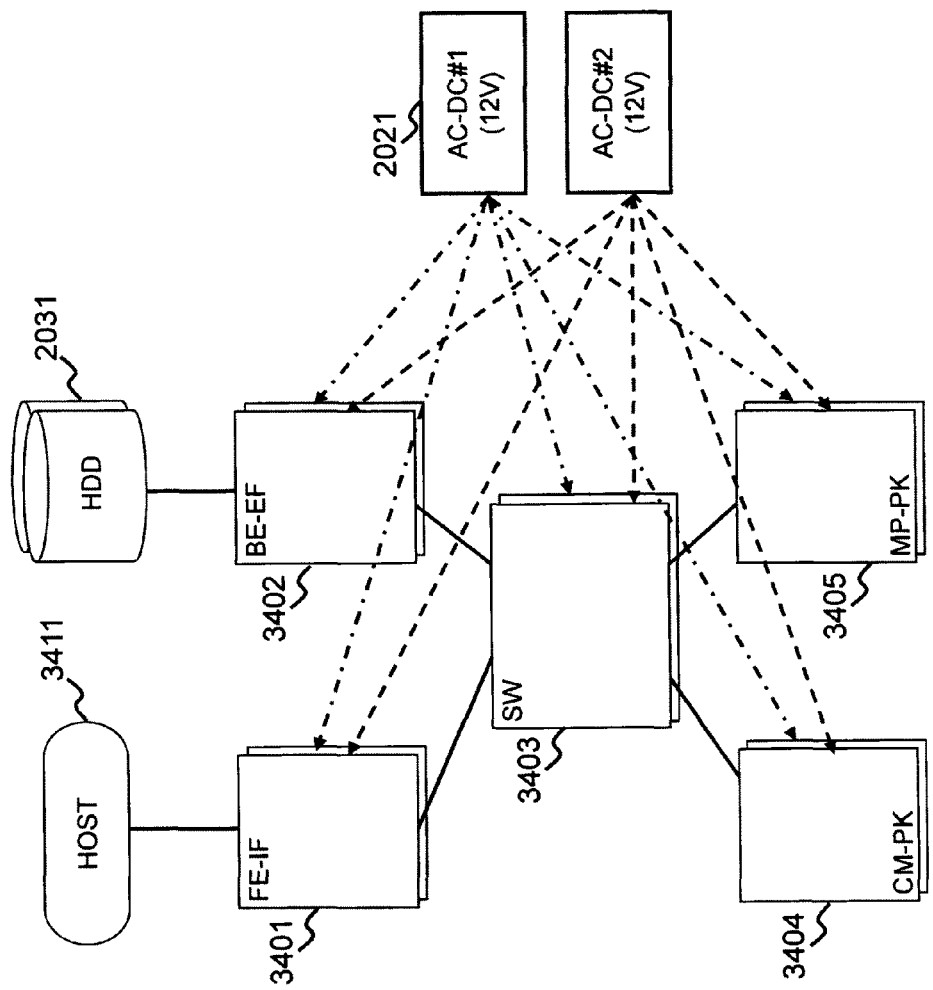
FIG. 34 shows a configuration of a controller, and the integration of the HDD AC-DC and the controller.

As described above, the AC-DC 2021 and the HDD-PWR 2023 are isolated from one another. Meanwhile, it is assumed that the controller requires DC12V. Accordingly, in this embodiment, the AC-DC 2021, which is the 12-volt power supply circuit of the HDD, is also utilized as the controller power supply circuit. Specifically, for example, the controller, as shown in FIG. 34, comprises a FE-IF (Front-end interface) 3401, a BE-IF (backend interface) 3402, a SW (switch) 3403, a CM-PK (cache memory package) 3404, and a MP-PK (microprocessor package) 3405. DC12V is supplied from the redundant AC-DC (AC-DC #1 and #2) to each of the elements 3401 through 3405. Additionally, a description of each element is as follows.

The FE-IF 3401 is an interface device connected to a host 3411. The FE-IF 3401 receives an I/O command (either a write command or a read command) from the host 3411, and transfers the received I/O command to the MP-PK 3405.

The BE-IF 3402 is an interface device connected to the HDD 2031. The BE-IF 3402 reads data from the HDD 2031 and transfers this data to the CM-PK 3404, and writes data from the CM-PK 3404 to the HDD 2031.

The MP-PK 3405 is a device comprising either one or multiple MP (microprocessors). The MP processes the I/O command from the FE-IF 3401.

The SW 3403 is connected to multiple packages, that is, to the FE-IF 3401, the BE-IF 3402, the CM-PK 3404, and the MP-PK 3405. The SW 3403 controls the connections among the PK (packages).

The CM-PK 3404 comprises a volatile memory and/or a nonvolatile memory, and temporarily stores data that is read/written from/to the HDD 2031.

The preceding is the description of the fourth embodiment.

EXAMPLE 5

The fifth embodiment is described below. In the course of the description, the differences from the fourth embodiment are mainly stated, and the description of what is common to the fourth embodiment is omitted or stated only briefly (The same also holds true for the sixth embodiment described below).

Figure 35:
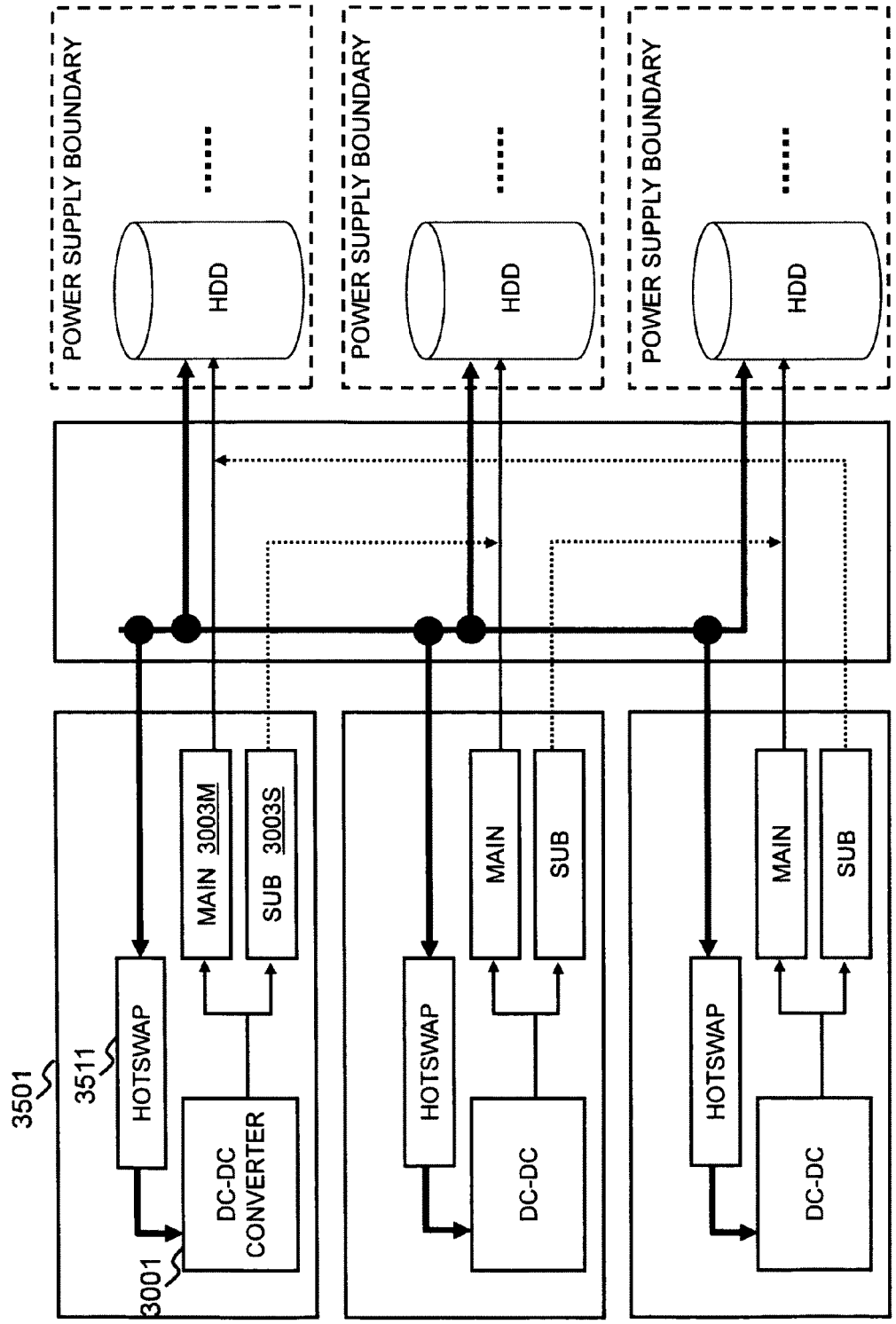
FIG. 35 shows wiring to a HDD-PWR related to a fifth embodiment of the present invention.

FIG. 35 shows the wiring to the HDD-PWR related to the fifth embodiment of the present invention.

In this embodiment, a hot swap circuit 3511 is disposed between the AC-DC and the DC-DC converter 3001 inside the HDD-PWR. According to the example of FIG. 35, the hot swap circuit 3511 is disposed in the HDD-PWR 3501, but may be provided outside the HDD-PWR 3501.

Figure 36:
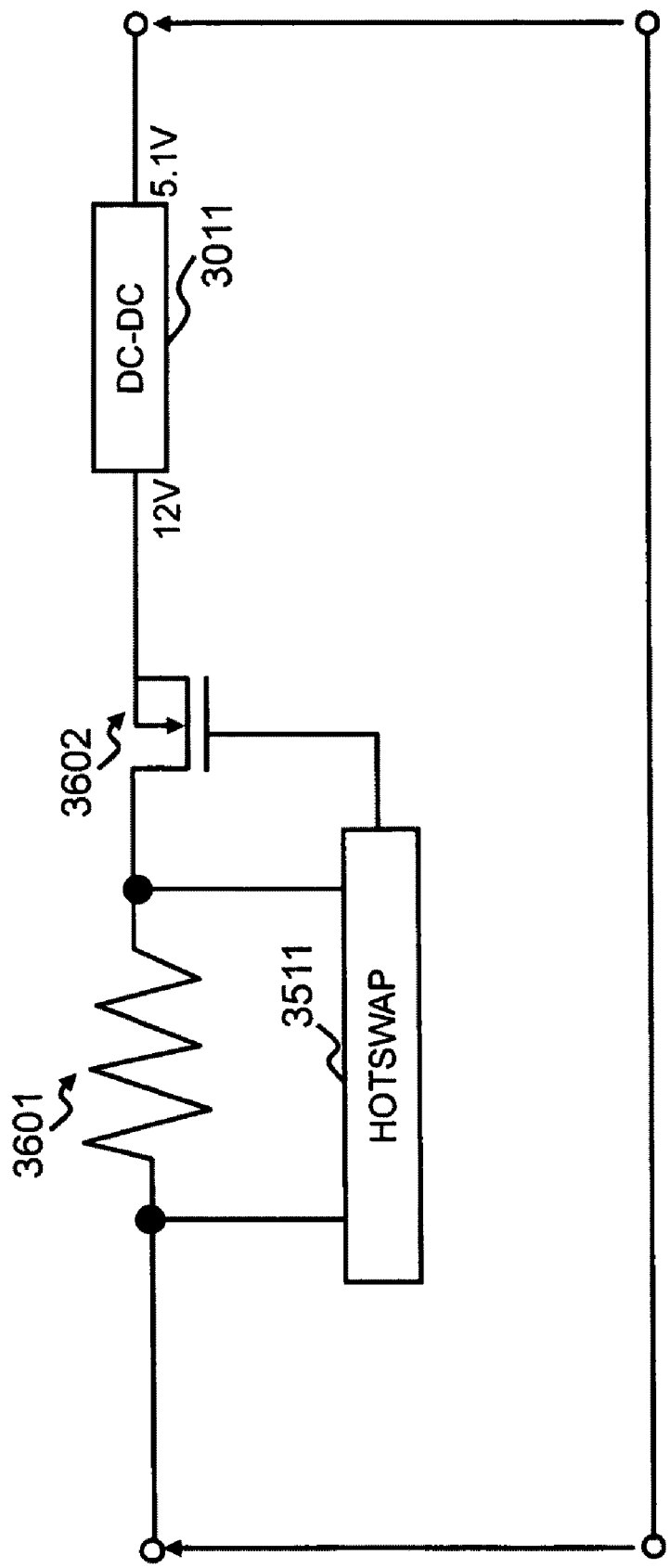
FIG. 36 shows a power shut-off mechanism that uses a hot swap circuit 3511.

FIG. 36 shows a power shut-off mechanism that utilizes the hot swap circuit 3511.

A resistor 3601 and a MOS-FET 3602, which are connected in series, are interposed between the AC-DC and the DC-DC converter 3001. The MOS-FET 3602 source is connected to the one end of the resistor 3601, the MOS-FET 3602 drain is connected to the input terminals of the DC-DC converter 3001, and the MOS-FET 3602 gate is connected to the hot swap circuit 3511. The hot swap circuit 3511 is connected to both ends of the resistor 3601.

The hot swap circuit 3511 measures the electric current that flows through the resistor 3601. The hot swap circuit 3511 sets the MOS-FET 3602 to the OFF state when this electric current is equal to or larger than a certain threshold. In accordance with this, the input of the DC-DC converter 3001 is shut off.

In the hot swap circuit 3511, although an error in electric current measurement impacts the shut-off performance, variations in the quality of circuit parts have little affect. In addition, since setting the MOS-FET 3602 to the OFF state shuts off the power supply line, rapid decision performance is high. Note that, as a method for shutting off the power when a failure occurs, a method that utilizes a fuse is conceivable, but with a fuse, there is an inversely proportional relationship between the electric current and the time it takes for fusing, and, in addition, the impact resulting from part variations is great. For this reason, the fuse is difficult to control as a power shut-off elemental device. Therefore, it is desirable that power shut-off be realized using a hot swap circuit as in this embodiment.

The preceding has been a description of the fifth embodiment. Note that, another type of switching elemental device may be used instead of the MOS-FET 3602.

EXAMPLE 6

Figure 37:
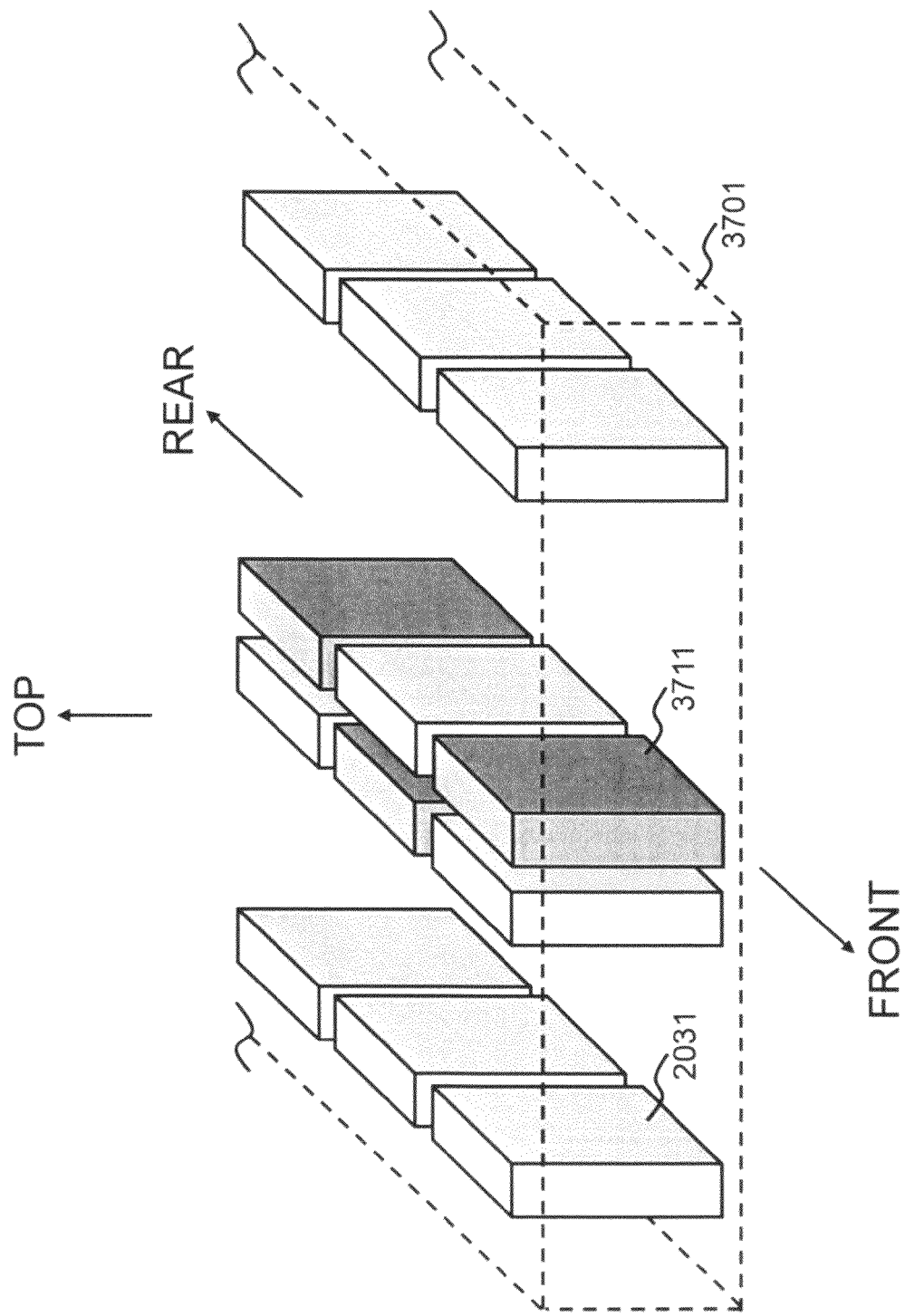
FIG. 37 shows the mounting of HDD and HDD-PWR related to a sixth embodiment of the present invention.

FIG. 37 shows the mounting of HDD and HDD-PWR related to a sixth embodiment of the present invention.

In the fourth and fifth embodiments, both the 3.5-inch enclosure and the 2.5-inch enclosure are racks, and the HDD 2031 are mounted from the front.

By contrast, in this embodiment, at the least one of the 3.5-inch enclosure and the 2.5-inch enclosure is not a rack, but rather a enclosure that comprises a HDD drawer 3701. According to this enclosure, either the HDD drawer 3701 is pulled out to add an HDD, and thereafter, the HDD 2301 is downwardly inserted and connected to the connector of the drawer 3701, or the HDD 2301 is upwardly pulled out from the drawer 3701.

According to this enclosure, the HDD inside the drawer 3701 are cooled by air that flows from the front to the rear.

Accordingly, in this embodiment, a power supply unit (a power supply unit comprising a HDD-PWR) 3711 of the same size as either the HDD or HDD unit (for example, a canister that houses HDD) that are mounted in this drawer 3701 is attached in a predetermined location inside the drawer 3701. Specifically, the power supply unit 3711 is attached to the predetermined location that is aligned (in either a row or column) with either the HDD or HDD unit. In accordance with this, the flow of air from the front side of the enclosure to the rear side of the enclosure is not blocked.

Furthermore, it is desirable that the power supply unit 3711 be arranged in close proximity to the HDD that configure the power supply boundary corresponding to this power supply unit 3711.

Further, arranging the power supply unit 3711 in any location inside a space where an HDD unit group is arranged as in the sixth embodiment may also be carried out for at the least one of the fourth and fifth embodiments.

The preferred embodiments of the present invention have been described above, but the present invention is not limited to these embodiments, and it goes without saying that various changes are possible without departing from the gist thereof.

For example, in the fourth through the sixth embodiments, instead of obtaining the DC5V from the DC12V, the DC5V may be obtained from the AC voltage from the commercial power supply (That is, a 5-volt system power supply circuit can be the AC-DC.)

Further, for example, in the feeding of power from the HDD-PWR 2023 to the power supply boundary, power feeding that conforms to the principle described in the first embodiment may be used instead of the power feeding method shown in FIG. 20. That is, in at the least one of the fourth through the sixth embodiments, a power feeding method that conforms to the first through the third embodiments may be used. For example, power supplies B1 and B2 in FIG. 7A may be the HDD-PWR #1 and #2 of FIG. 20, and the power supplies R1 and R2 in FIG. 7A may be the HDD-PWR #3 and #4 of FIG. 20.

In addition, for example, another type of transistor, such as a bipolar transistor, may be used instead of the MOS-FET.

The invention claimed is:
1. A storage system comprising:
multiple physical storage devices; and
a power supply for the multiple physical storage devices,
wherein each physical storage device is a device that is configured to require an input of a first voltage and an input of a second voltage that is a lower voltage than the first voltage,
wherein the power supply comprises at least one first power supply circuit configured to be made redundant, and at least one second power supply circuit configured to be made redundant,
wherein the first power supply circuit is configured to output a first voltage that is input to corresponding physical storage devices,
wherein the second power supply circuit is configured to output a second voltage to a storage device group that corresponds to the second power supply circuit,
wherein the storage device group comprises two or more physical storage devices from among the multiple physical storage devices, and
wherein the respective second power supply circuits are isolated from a circuit board comprising the first power supply circuit;
one or more enclosures in which the multiple physical storage devices are mounted; and
a controller that controls the input/output of data to/from the multiple physical storage devices,
wherein each of the one or more enclosures is either a 3.5-inch enclosure, which is a enclosure in which a 3.5-inch HDD (Hard Disk Drive) is mounted, or a 2.5-inch enclosure, which is a enclosure in which a 2.5-inch HDD is mounted,
wherein the 3.5-inch enclosure and the 2.5-inch enclosure are the same size,
wherein the first power supply circuit of the 3.5-inch HDD is the same as the first power supply circuit of the 2.5-inch HDD, and the second power supply circuit of the 3.5-inch HDD is the same as the second power supply circuit of the 2.5-inch HDD,
wherein the first power supply circuit comprises an AC-DC converter configured to convert an alternating current voltage from a commercial power supply to the first voltage of direct current of 12V,
wherein the second power supply circuit comprises a DC-DC converter configured to convert the first voltage to a third voltage of direct current of 5V, a main channel circuit, which is a circuit configured to output a main second voltage that is a second voltage obtained by stepping down the third voltage from the DC-DC converter, and a sub channel circuit, which is configured to output a sub second voltage that is a second voltage obtained by stepping down the third voltage from the DC-DC converter to a lower level than that of the main channel circuit,
wherein the main channel circuit comprises a first transistor and a first transistor controller,
wherein in a case where the voltage of the input side of the first transistor is higher than that of the output side of the first transistor, the first transistor controller is configured to output, from the first transistor, the main second voltage which is the voltage obtained by stepping down the third voltage, by exercising control such that a first potential difference between the input side and the output side of the first transistor becomes constant, and in a case where the voltage of the output side of the first transistor is higher than that of the input side of the first transistor, the first transistor controller turns OFF the first transistor,
wherein in a case where the voltage of the input side of a second transistor is higher than that of the output side of the second transistor, the second transistor controller is configured to output, from the second transistor, the sub second voltage which is the voltage obtained by stepping down the third voltage, by exercising control such that a second potential difference between the input side and the output side of the second transistor becomes constant and becomes also lower than the second potential difference, and in a case where the voltage of the output side of the second transistor is higher than that of the input side of the second transistor, the second transistor controller turns OFF the second transistor, wherein regardless of whether the physical storage device is a 3.5-inch HDD or a 2.5-inch HDD, the second power supply circuit is arranged, in each enclosure, closer to a storage device group, into which the main second voltage is input from the second power supply circuit, than another second power supply circuit which inputs the sub second voltage to this storage device group, wherein a main second voltage is input to each storage device group from the second power supply circuit that is the closest to this storage device group, and when the main second voltage ceases to be input from this second power supply circuit, the sub second voltage is input from another second power supply circuit that is the closest to another storage device group other than the storage device group, and wherein the power supply circuit of the controller is the first power supply circuit;

wherein a second voltage is input to each storage device group from a second power supply circuit corresponding to this storage device group, and when the second voltage ceases to be input from this second power supply circuit, the second voltage is input from another second power supply circuit corresponding to a storage device group other than this storage device group;

wherein the second power supply circuit is configured to convert an input voltage to a third voltage, and to output a main second voltage which is a second voltage obtained by stepping down the third voltage, and a sub second voltage which is a second voltage obtained by stepping down the third voltage to a larger extent, wherein the second voltage input from the corresponding second power supply circuit is the main second voltage, and wherein the second voltage input from the other second power supply circuit is the sub second voltage.

2. A storage system according to claim 1, wherein the main second voltage is a voltage obtained by stepping down the third voltage by the first transistor, and wherein the sub second voltage is a voltage obtained by stepping down the third voltage by the second transistor.

3. A storage system according to claim 2, further comprising:

a first transistor controller configured to turn OFF the first transistor in a case where the voltage of the output side of the first transistor is higher than the voltage of the input side of the first transistor; and a second transistor controller configured to turn OFF the second transistor in a case where the voltage of the output side of the second transistor is higher than the voltage of the input side of the second transistor.

4. A storage system according to claim 1, wherein, when the second voltage ceases to be supplied from a single second power supply circuit to two or more storage device groups to which the second voltage is respectively input via two or more paths from this single second power supply circuit, the second voltage is respectively input from a different second power supply circuit.

5. A storage system according to claim 4, wherein, in a case where the number of the storage device groups is equal to or larger than 4, the number of the second power supply circuits is equal to or less than the number of the storage device groups.

6. A storage system according to claim 1, wherein the second power supply circuit is arranged closer to a power supply boundary, to which the main second voltage is supplied from the second power supply circuit, than another second power supply circuit that supplies the sub second voltage to this power supply boundary.

7. A storage system according to claim 1, wherein each second power supply circuit is arranged in proximity to a storage device group corresponding to this second power supply circuit.

8. A storage system according to claim 1, further comprising:

one or more enclosures in which the multiple physical storage devices are mounted, wherein each enclosure is either a 3.5-inch enclosure, which is a enclosure in which a 3.5-inch HDD is mounted or a 2.5-inch enclosure, which is a enclosure in which a 2.5-inch HDD is mounted, and wherein the first power supply circuit of the 3.5-inch HDD is the same as the first power supply circuit of the 2.5-inch HDD, and the second power supply circuit of the 3.5-inch HDD is the same as the second power supply circuit of the 2.5-inch HDD.

9. A storage system according to claim 1, wherein the first voltage from the first power supply circuit is input to the second power supply circuit, and wherein the second power supply circuit is configured to create the second voltage from the first voltage.

10. A storage system according to claim 9, wherein a switching elemental device is disposed on a power supply line from the first power supply circuit to the second power supply circuit, and wherein the storage system comprises a hot swap circuit configured to shut off the power supply of the second power supply circuit by turning off the switching elemental device when the electric current flowing through the power supply line exceeds a predetermined value.

11. A storage system according to claim 1, wherein the first power supply circuit is configured to convert an alternating current voltage from a commercial power supply to the first voltage of direct current.

12. A storage system according to claim 1, wherein a unit, which has the second power supply circuit and is the same size as either the physical storage device or a storage device unit that is a unit comprising this physical storage device, is attached in a predetermined location in a line of either the physical storage devices or the storage device units.

* * * * *